(12) United States Patent
Delcroix et al.

(10) Patent No.: US 11,763,834 B2
(45) Date of Patent: Sep. 19, 2023

(54) MASK CALCULATION DEVICE, CLUSTER WEIGHT LEARNING DEVICE, MASK CALCULATION NEURAL NETWORK LEARNING DEVICE, MASK CALCULATION METHOD, CLUSTER WEIGHT LEARNING METHOD, AND MASK CALCULATION NEURAL NETWORK LEARNING METHOD

(71) Applicant: NIPPON TELEGRAPH AND TELEPHONE CORPORATION, Tokyo (JP)

(72) Inventors: Marc Delcroix, Soraku-gun (JP); Keisuke Kinoshita, Soraku-gun (JP); Atsunori Ogawa, Soraku-gun (JP); Takuya Higuchi, Soraku-gun (JP); Tomohiro Nakatani, Soraku-gun (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 102 days.

(21) Appl. No.: 16/630,856

(22) PCT Filed: Jul. 18, 2018

(86) PCT No.: PCT/JP2018/026960
§ 371 (c)(1),
(2) Date: Jan. 14, 2020

(87) PCT Pub. No.: WO2019/017403
PCT Pub. Date: Jan. 24, 2019

(65) Prior Publication Data
US 2020/0143819 A1 May 7, 2020

(30) Foreign Application Priority Data

Jul. 19, 2017 (JP) ................................ 2017-140225

(51) Int. Cl.
*G10L 21/0308* (2013.01)
*G10L 15/02* (2006.01)
(Continued)

(52) U.S. Cl.
CPC .......... *G10L 21/0308* (2013.01); *G06N 3/045* (2023.01); *G10L 15/02* (2013.01); *G10L 15/16* (2013.01); *G10L 15/22* (2013.01)

(58) Field of Classification Search
CPC ..... G10L 21/0308; G10L 15/02; G10L 15/16; G10L 15/22; G10L 25/30; G10L 21/0272;
(Continued)

(56) References Cited

U.S. PATENT DOCUMENTS 5,155,801 A 10/1992 Lincoln
5,335,312 A 8/1994 Mekata et al.
(Continued)

FOREIGN PATENT DOCUMENTS

JP 05-066795 A 3/1993

OTHER PUBLICATIONS

International Search Report and Written Opinion dated Oct. 2, 2018 for PCT/JP2018/026960 filed on Jul. 18, 2018, 8 pages including English Translation of the International Search Report.
(Continued)

*Primary Examiner* — Michael N Opsasnick
(74) *Attorney, Agent, or Firm* — XSENSUS LLP

(57) ABSTRACT

Features are extracted from an observed speech signal including at least speech of multiple speakers including a target speaker. A mask is calculated for extracting speech of the target speaker based on the features of the observed speech signal and a speech signal of the target speaker serving as adaptation data of the target speaker. The signal of the speech of the target speaker is calculated from the observed speech signal based on the mask. Speech of the
(Continued)

target speaker can be extracted from observed speech that includes speech of multiple speakers.

8 Claims, 10 Drawing Sheets

(51) Int. Cl.
*G10L 15/16* (2006.01)
*G10L 15/22* (2006.01)
*G06N 3/045* (2023.01)

(58) Field of Classification Search
CPC .... G06N 3/0454; G06N 3/0445; G06N 3/084; G06N 3/0481
See application file for complete search history.

(56) References Cited

U.S. PATENT DOCUMENTS

| | | | | |
|---|---|---|---|---|
| 2008/0010065 | A1* | 1/2008 | Bratt | G06F 18/23211 704/E15.002 |
| 2011/0282658 | A1* | 11/2011 | Wang | G10L 21/0272 704/207 |
| 2012/0232900 | A1* | 9/2012 | Brummer | G10L 17/02 704/239 |
| 2013/0300648 | A1* | 11/2013 | Kim | G04G 21/00 345/156 |
| 2014/0108020 | A1* | 4/2014 | Sharma | G10L 19/018 704/500 |
| 2015/0127336 | A1* | 5/2015 | Lei | G10L 17/18 704/232 |
| 2015/0149165 | A1* | 5/2015 | Saon | G10L 15/063 704/232 |
| 2015/0161995 | A1* | 6/2015 | Sainath | G10L 15/063 704/232 |
| 2016/0005394 | A1* | 1/2016 | Hiroe | G10L 21/0272 704/248 |
| 2017/0110120 | A1* | 4/2017 | Yu | G10L 25/84 |
| 2017/0178666 | A1 | 6/2017 | Yu | |
| 2017/0359666 | A1* | 12/2017 | Lyren | G10L 15/04 |
| 2018/0293988 | A1* | 10/2018 | Huang | G10L 17/20 |

OTHER PUBLICATIONS

Dehak, N., et al., "Front-End Factor Analysis for Speaker Verification," IEEE Transactions on Audio, Speech, and Language Processing, vol. 19, No. 4, IEEE, May 2011, pp. 788-798.

Delcroix, M., et al., "Context Adaptive Deep Neural Networks for Fast Acoustic Model Adaptation in Noisy Conditions," IEEE International Conference on Acoustics, Speech and Signal Processing (ICASSP), IEEE, Mar. 2016, 5 pages.

Haykin, S., "Neural Networks: A Comprehensive Foundation," Second Edition, Chapter 4 Multilayer, Section 4.3 Back-Propagation Algorithm, Prentice Hall PTR Upper Saddle River, NJ, USA, 1999, pp. 160-175.

Heymann, J., et al., "Neural Network Based Spectral Mask Estimation for Acoustic Beamforming," IEEE International Conference on Acoustics, Speech and Signal Processing (ICASSP), IEEE, Mar. 2016, pp. 196-200.

Wang, Y., et al., "On Training Targets for Supervised Speech Separation," IEEE/ACM Transactions on Audio, Speech, and Language Processing, vol. 22, No. 12, IEEE, Dec. 2014, pp. 1849-1858.

\* cited by examiner

MASK CALCULATION DEVICE, CLUSTER WEIGHT LEARNING DEVICE, MASK CALCULATION NEURAL NETWORK LEARNING DEVICE, MASK CALCULATION METHOD, CLUSTER WEIGHT LEARNING METHOD, AND MASK CALCULATION NEURAL NETWORK LEARNING METHOD

CROSS-REFERENCE TO RELATED APPLICATIONS

The present application is based on PCT filing PCT/JP2018/026960, filed Jul. 18, 2018, which claims priority to JP 2017-140225, filed Jul. 19, 2017, the entire contents of each are incorporated herein by reference.

FIELD

The present invention relates to a mask calculation device, a cluster weight learning device, a mask calculation neural network learning device, a mask calculation method, a cluster weight learning method, and a mask calculation neural network learning method.

BACKGROUND

In recording speech of a speaker, ambient noise may possibly be recorded simultaneously with the speech of the speaker. In this case, it is difficult to catch only the speech of the speaker from the recorded speech. To address this, conventionally developed are techniques for extracting speech of a target speaker from observed speech signal including noise (refer to Non Patent Literature 1 or 2, for example).

Non Patent Literature 1, for example, describes a technique of calculating a mask for extracting, from observed signals, speech signals of a dominant speaker. Non Patent Literature 2, for example, describes a technique of calculating a mask using a neural network.

CITATION LIST

Non Patent Literature

Non Patent Literature 1: Y Wang, A Narayanan, D L Wang, "On training targets for supervised speech separation", IEEE/ACM Transactions on Audio, Speech and Language processing, 2014

Non Patent Literature 2: J Heymann, L Drude, R Haeb-Umbach, "Neural network based spectral mask estimation for acoustic beamforming", Acoustics, Speech and Signal Processing (ICASSP), 2016

SUMMARY

Technical Problem

If observed speech includes speech of multiple speakers, it is difficult for the conventional techniques to extract the speech of the target speaker. The conventional techniques, for example, consider the speech other than the speech of the target speaker to be noise and assume that the speech of the speaker and the noise have different spectro-temporal characteristics from each other. If the observed speech includes speech of multiple speakers, the conventional techniques fail to recognize the speech of the speakers other than the target speaker as noise because the spectro-temporal characteristics of the speech of the speakers are similar. As a result, it is difficult for the conventional techniques to extract only the speech of the target speaker.

Solution to Problem

To solve a problem and to achieve an object, a mask calculation device includes: a feature extractor configured to extract features from an observed speech signal including at least speech of one or more speakers including a target speaker; a mask calculator configured to calculate a mask for extracting speech of the target speaker from the observed speech signal based on the features of the observed speech signal and a speech signal of the target speaker serving as adaptation data of the target speaker; and an object signal calculator configured to calculate the signal of the speech of the target speaker from the observed speech signal based on the mask.

To solve a problem and to achieve an object, a cluster weight learning method executed by a computer, the cluster weight learning method includes: a step of calculating weights corresponding to respective clusters in a first neural network with at least one of layers divided into the clusters, based on a signal of speech of a target speaker using a second neural network; a step of calculating a mask for extracting features of the speech of the target speaker from a features in an observed speech signal of one or more speakers including the target speaker based on the features in the observed speech signal of the one or more speakers using the first neural network weighted by the weights calculated at the step of calculating the weights; a step of calculating a differential value of the weights by considering the first neural network and the second neural network as a connected neural network and performing error backpropagation on the connected neural network; and a step of updating the cluster weights based on the differential value of the cluster weights calculated at the step of calculating the differential value of the weights.

To solve a problem and to achieve an object, a mask calculation neural network learning method executed by a computer, the mask calculation neural network learning method includes: a step of calculating weights corresponding to respective clusters in a first neural network with at least one of layers divided into the clusters, based on a signal of speech of a target speaker using a second neural network; a step of calculating a mask for extracting features of speech of the target speaker from a features in an observed speech signal of one or more speakers including the target speaker based on the features in the observed speech signal of the one or more speakers using the first neural network weighted by the weights calculated at the step of calculating the weights; a step of calculating a differential value of a parameter of the first neural network by considering the first neural network and the second neural network as a connected neural network and performing error backpropagation on the connected neural network; a step of updating the parameter of the first neural network based on the differential value of the parameter calculated at the step of calculating the differential value of the parameter of the first neural network; a step of calculating a differential value of a parameter of the second neural network by performing error backpropagation on the connected neural network; and a step of updating the parameter of the second neural network based on the differential value of the second parameter calculated at the step of calculating the differential value of the parameter of the second neural network.

Advantageous Effects of Invention

The present invention can extract speech of a target speaker from observed speech that includes speech of multiple speakers.

DESCRIPTION OF EMBODIMENTS

Exemplary embodiments of a mask calculation device, a cluster weight learning device, a mask calculation neural network learning device, a mask calculation method, a cluster weight learning method, and a mask calculation neural network learning method according to the present disclosure are described below in greater detail with reference to the accompanying drawings. The embodiments below are not intended to limit the present invention.

In the following description, when A is a vector, for example, it is denoted as "vector A". When A is a matrix, for example, it is denoted as "matrix A". When A is a scalar, for example, it is simply denoted as "A". When A is a set, for example, it is denoted as "set A". A function f of the vector A is denoted as f(vector A), for example. When A is a vector, a matrix, or a scalar, "^A" is equivalent to "symbol with '^' right above 'A'". When A is a vector, a matrix, or a scalar, "−A" is equivalent to "symbol with '−' right above 'A'". When A is a vector, a matrix, or a scalar, "~A" is equivalent to "symbol with '~' right above 'A'". When A is a vector or a matrix, $A^T$ indicates the transpose of A.

Conventional Target Speech Extraction Device

Figure 1:
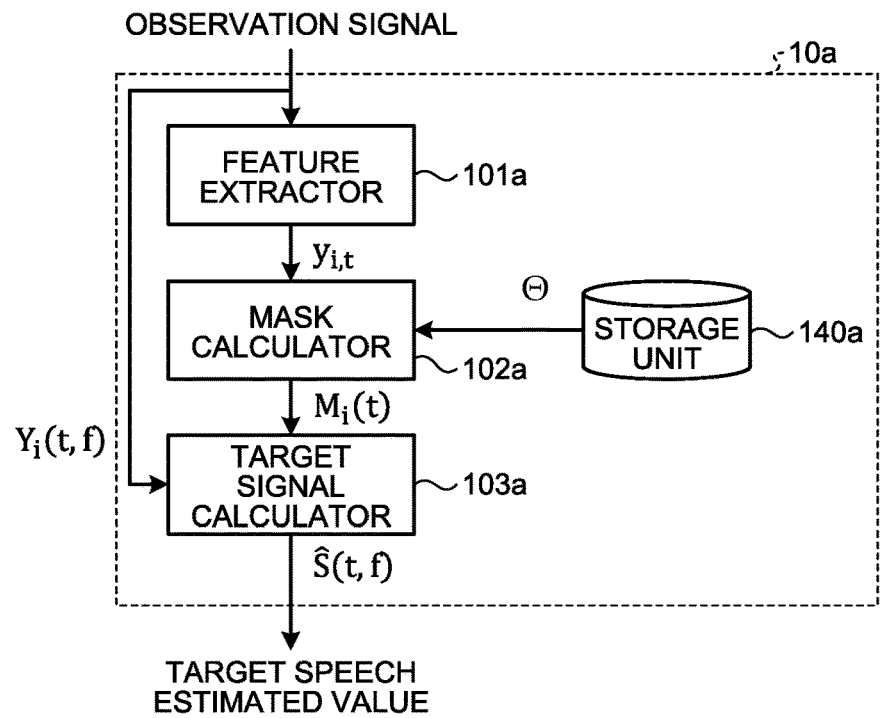
FIG. 1 is a diagram of an exemplary configuration of a conventional target speaker extraction device.

The configuration of a conventional target speaker extraction device is described first with reference to FIG. 1. FIG. 1 is a diagram of an exemplary configuration of the conventional target speaker extraction device. As illustrated in FIG. 1, a target speaker extraction device 10a includes a feature extractor 101a, a mask calculator 102a, a target signal calculator 103a, and a storage unit 140a.

The storage unit 140a stores therein learned parameters of a calculation model for calculating a mask. If the mask is calculated based on neural networks (hereinafter, NN), for example, the storage unit 140a stores therein the parameters of the NNs. Examples of the parameters of the NNs include, but are not limited to, parameters of a weight matrix on hidden layers, parameters of a bias vector, parameters of an activation function, etc. The processing of the hidden layers of the NNs, for example, is defined by Expression (1):

$$x_t^{(l)} = \sigma^{(l)}(F^{(l)}(x_t^{(l-1)}; \theta^{(l)})) \tag{1}$$

In Expression (1), t is an index of a time frame, l is an index of a hidden layer, $x_t^{(l-1)}$ and $x_t^{(l)}$ are input and output, respectively, of the hidden layer, and $\sigma^{(l)}(\cdot)$ is an activation function. Examples of the activation function include, but are not limited to, a sigmoid function, a Relu function, etc. $F^{(l)}(\cdot; \theta^{(l)})$ is a transformation function. Examples of the transformation function include, but are not limited to, linear transformation, convolution, etc. $\theta^{(l)}$ is a parameter of the transformation function. In a conventional NN, for example, $F^{(l)}(\cdot; \theta^{(l)})$ is calculated by Expression (2):

$$F^{(l)}(x; \theta^{(l)}) = W^{(l)}x + b^{(l)} \tag{2}$$

In Expression (2), $W^{(l)}$ and $b^{(l)}$ are a linear transformation matrix and a bias vector, respectively. In Expression (2), $\theta^{(l)} = \{W^{(l)}, b^{(l)}\}$ is satisfied. The parameters of the entire NN are represented by $\theta = \{\theta^{(l)}, \ldots, \theta^{(L)}\}$. In this case, the total number of hidden layers of the entire NN is L−1. The parameters of the NN can be defined in the same manner in a convolution layer and a recurrent layer, such as LSTM/BLSTM.

The feature extractor 101a calculates short-time Fourier transform (STFT) from a waveform of input signals. In the STFT region, an observation signal is calculated by Expression (3):

$$Y_i(t,f) = S_i(t,f) + N_i(t,f) \tag{3}$$

In Expression (3), i=1, . . . , I is an index of a microphone, t=1, . . . , T is an index of time, and f=1, . . . , F is an index of frequency. $Y_i(t,f)$, $S_i(t,f)$, and $N_i(t,f)$ are STFT of an observation, target speech, and noise signals, respectively. The feature vector is represented by $y(i,t) = [|Y_i(t, 1)|, \ldots, |Y_1(t,F)|]$ where |•| denotes an amplitude. A feature vector sequence $Y_i$ serving as a time-series feature vector is calculated by Expression (4):

$$Y_i = \{y_{i,1}, \ldots, y_{i,T} | y_{i,t} \in R^F\} \tag{4}$$

In other words, $Y_i$ is data expressed by F-dimensional feature vectors from the first frame to the T-th frame. An analysis is carried out with an analysis frame width of substantially 30 ms and an analysis frame shift width of substantially 10 ms, for example.

The mask calculator 102a calculates a time-frequency mask. The time-frequency mask indicates whether a target signal or noise is dominant with respect to each time-frequency bin (t,f). By using the time-frequency mask, the target signal calculator 103a can extract target speech as indicated by Expression (5). In the following description, the time-frequency mask may be simply referred to as a mask.

$$\hat{S}_i(t,f) = M_i(t,f) Y_i(t,f) \tag{5}$$

In Expression (5), $M_i(t,f)$ is a mask for extracting the target signal.

The mask calculator 102a can calculate the mask using the NN as indicated by Expression (6-1):

$$M_i(t) = g(y_{i,t}, \theta) \tag{6-1}$$

$$M_i(t) = [M_i(t,1), \ldots, M_i(t,F)] \tag{6-2}$$

Expression (6-2) indicates a vector of a value of the mask with respect to frequencies. In Expression (6-1), g(•, θ) indicates the NN. Input of the NN is a feature $y_{i,t}$ extracted by the feature extractor 101a. A mask calculation NN parameter θ is stored in the storage unit 140a.

When a learning device, which is not illustrated, learns the parameter θ of the NN used by the mask calculator 102a, it requires data on speech and noise. The learning device may use the functions of the target speaker extraction device 10a. The learning device creates a label necessary for the learning of the NN from the data on speech and noise. The learning device calculates a correct mask from the data on speech and noise, for example. By using the correct mask as a label, the learning device optimizes the NN based on the cross entropy. The learning device performs optimization by error backpropagation. The learning device can calculate the correct mask by Expression (7-1):

$$\hat{M}_i(t,f) = \begin{cases} 1, & \text{if } \frac{|S_i(t,f)|}{|N_{i(t,f)}|} > \epsilon \\ 0, & \text{otherwise} \end{cases} \tag{7-1}$$

$$\hat{M}_i(t) = [\hat{M}_i(t,1), \ldots, \hat{M}_i(t,F)] \tag{7-2}$$

$$\frac{|S_i(t,f)|}{|N_{i(t,f)}|} \tag{7-3}$$

Expression (7-2) indicates a correct mask. Expression (7-3) indicates a signal to noise ratio (S/N ratio). In Expression (7-1), 8 is a threshold of the S/N ratio.

The target signal calculator 103a calculates target speech based on the mask calculated by the mask calculator 102a and STFT of the observation signals calculated by the feature extractor 101a. If the number of microphones is one (I=1), the target signal calculator 103a calculates the signal of target speech as indicated by Expression (8):

$$\hat{S}(t,f) = M(t,f)Y(t,f) \tag{8}$$

If the number of microphones is plural (I>1), the target signal calculator 103a estimates masks from the signals of the respective microphones and calculates an integrated mask (integration mask) as indicated by Expression (9):

$$M(t,f) = \text{median}([M_1(t,f), \ldots, M_I(t,f)]) \tag{9}$$

In Expression (9), M(t,f) is a mask resulting from integration, and median (•) is a function for calculating a median. By using the integration mask, the target signal calculator 103a can calculate a spatial correlation matrix of target speech as indicated by Expression (10):

$$\Phi_{ss}(f) = \frac{\sum_{t=1}^{T} M(t,f) Y(t,f) Y(t,f)^H}{\sum_{t=1}^{T} M(t,f)} \tag{10}$$

In Expression (10), $\phi_{ss}(f)$ is a spatial correlation matrix of target speech, $Y(t,f) = [Y_1(t,f), \ldots, Y_I(t,f)]$ is a set of vectors of the signals of the respective microphones, and $\cdot^H$ is Hermitian transpose. Similarly, by using the integration mask, the target signal calculator 103a can calculate a spatial correlation matrix of noise as indicated by Expression (11):

$$\Phi_{NN}(f) = \frac{\sum_{t=1}^{T} M^N(t,f) Y(t,f) Y(t,f)^H}{\sum_{t=1}^{T} M^N(t,f)} \tag{11}$$

In Expression (11), $\phi_{NN}(f)$ is a spatial correlation matrix of a noise signal, and $M^N(t,f)$ is a mask for extracting the noise signal. $1-M(t,f)$ may be used as $M^N(t,f)$. Alternatively, the NN included in the mask calculator 102a may be configured to receive the feature vector series of the observation signals and output a mask $M_i^N(t,f)$ for extracting the noise signals besides a mask $M_i(t,f)$ for extracting the target signals. In this case, a mask resulting from integrating $M_i^N(t,f)$ obtained as output of the NN may be used as $M^N(t,f)$.

The target signal calculator 103a can calculate a beamformer based on the spatial correlation matrices. The target signal calculator 103a can calculate an MVDR beamformer or a MaxSNR beamformer widely used as a beamformer, for example, based on the spatial correlation matrix.

The target signal calculator 103a, for example, calculates a filter of the MaxSNR beamformer as indicated by Expression (12-1). The calculated filter is represented by Expression (12-2). As indicated in Expression (12-3), $\phi_{YY}(f)$ is a spatial correlation matrix of the observation signal.

$$W(f) = P(\Phi_{NN}(f)^{-1} \Phi_{YY}(f)) \tag{12-1}$$

$$W(f) = [W_1(f), \ldots, W_I(f)] \tag{12-2}$$

$$\Phi_{YY}(f) = \frac{1}{T} \sum_{t=1}^{T} Y(t,f) Y(t,f)^H \tag{12-3}$$

The target signal calculator 103a uses the filter of the beamformer to calculate the signal of target speech as indicated by Expression (13):

$$\hat{S}(t,f) = W^H(f) Y(t,f) \tag{13}$$

If the number of microphones is either one or plural, the target signal calculator 103a can calculate the signals in the STFT region by inverse FFT and the Overlap-add method, for example, to calculate the waveform signals of target speech.

Figure 2:
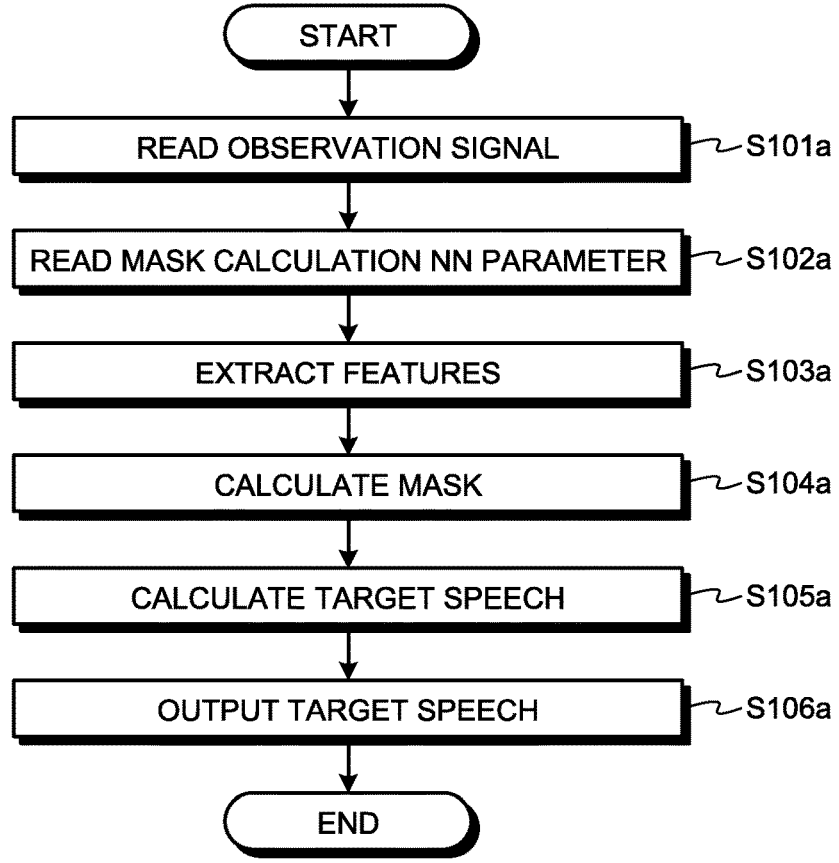
FIG. 2 is a flowchart of a process performed by the conventional target speaker extraction device.

FIG. 2 is a flowchart of a process performed by the conventional target speaker extraction device. As illustrated in FIG. 2, the feature extractor 101a reads the observation signals (Step S101a). The mask calculator 102a reads the mask calculation NN parameter from the storage unit 140a (Step S102a). Subsequently, the feature extractor 101a extracts the features from the observation signals (Step S103a).

The mask calculator 102a calculates a mask based on the features and the mask calculation NN parameter (Step S104a). The target signal calculator 103a uses the mask to calculate the signals of target speech from the observation signals (Step S105a). Subsequently, the target signal calculator 103a outputs the calculated signals of target speech (Step S106a).

Structure of the NN Used in the Embodiments According to the Present Invention

The following describes the NN used to calculate a mask in the embodiments according to the present invention. The embodiments use an NN with at least one of the layers divided into multiple clusters as indicated by Expression (14) to calculate a mask (reference: M. Delcroix, K. Kinoshita, C. Yu, A. Ogawa, T. Yoshioka, T. Nakatani, "Context adaptive deep neural networks for fast acoustic model adaptation in noisy conditions", in Proc. IEEE International Conference on Acoustics, Speech and Signal Processing (ICASSP), 2016).

$$x_t^{(1)} = \sigma^{(l)}\left(\sum_{k=1}^{K} \alpha_k F_k^{(l)}(x_t^{(l-1)}; \theta_k^{(l)})\right) \quad (14)$$

In Expression (14), k=1, . . . , K is an index of a cluster, K is the number of clusters, $F_k^{(l)}(\bullet; \theta_k^{(l)})$ is a transformation function of the k-th speaker cluster, and $\alpha_k$ is a weight of the k-th cluster. The weight of the cluster is a vector $\alpha = [\alpha_1, \ldots, \alpha_k]$. Examples of the neural network with at least one of the layers divided into a plurality of clusters include, but are not limited to, a speaker dependent NN, an NN using a speaker dependent layer, an NN using a speaker adaptive layer, etc.

Speaker Dependent NN

The speaker dependent NN is an NN with all the layers divided into multiple clusters. In the speaker dependent NN, K is equal to the number of speakers in learning data. In the speaker dependent NN, the vector $\alpha$ is a 1 hot vector indicating a speaker ID. The 1 hot vector is a vector having a value of one component of 1 and a value of the other components of 0. In the speaker dependent NN, NNs are prepared for the respective speakers. In learning the speaker dependent NN and extracting target speech using the speaker dependent NN, speech of the same speaker is used. In other words, in the speaker dependent NN, the parameters of the NN are assumed to be learned based on speech signals prepared for learning for at least one or more speakers including speech signals of the target speaker to be extracted.

NN Using a Speaker Dependent Layer

The NN using a speaker dependent layer is an NN with at least one of the layers divided into multiple clusters. In the NN using a speaker dependent layer, K is equal to the number of speakers in the learning data. In the NN using a speaker dependent layer, the vector $\alpha$ is a 1 hot vector indicating a speaker ID. In the NN using a speaker dependent layer, clusters of hidden layers are prepared for the respective speakers. In learning the NN using a speaker dependent layer and extracting target speech by using the NN using a speaker dependent layer, speech of the same speaker is used. In other words, in the NN using a speaker dependent layer, the parameters of the NN are assumed to be learned based on speech signals prepared for learning for at least one or more speakers including the speech signals of the target speaker to be extracted.

NN Using a Speaker Adaptive Layer

The NN using a speaker adaptive layer is an NN with at least one of the layers divided into multiple clusters. In the NN using a speaker adaptive layer, K is equal to or smaller than the number of speakers in the learning data. In the NN using a speaker adaptive layer, the vector $\alpha$ needs not be a 1 hot vector. In learning the NN using a speaker adaptive layer and extracting target speech by using the NN using a speaker adaptive layer, speech of the same target speaker needs not be used. As a result, the NN using a speaker adaptive layer has higher versatility.

First Embodiment

A mask calculation device and a mask calculation neural network learning device according to a first embodiment are described below. The mask calculation device and the mask calculation neural network learning device may be provided as different computers or functions of one computer.

Mask Calculation Device According to the First Embodiment

Figure 3:
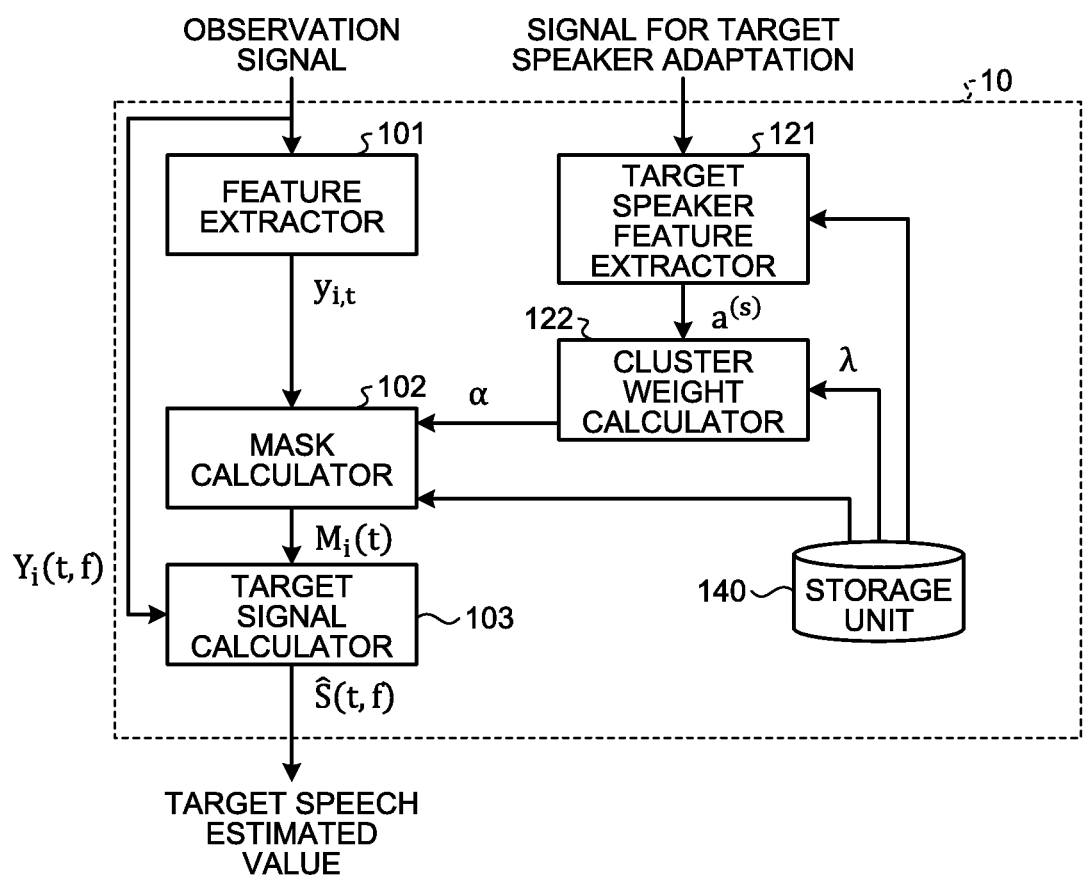
FIG. 3 is a diagram of an exemplary configuration of a mask calculation device according to a first embodiment.

The configuration of the mask calculation device according to the first embodiment is described first with reference to FIG. 3. FIG. 3 is a diagram of an exemplary configuration of the mask calculation device according to the first embodiment. As illustrated in FIG. 3, a mask calculation device 10 includes a feature extractor 101, a mask calculator 102, a target signal calculator 103, a target speaker feature extractor 121, a cluster weight calculator 122, and a storage unit 140.

The storage unit 140 stores therein a speaker feature extraction model parameter, a cluster weight calculation NN parameter, and a mask calculation NN parameter. The speaker feature extraction model parameter is a parameter of a predetermined calculation model used by the target speaker feature extractor 121. The cluster weight calculation NN parameter is a parameter of an NN used by the cluster weight calculator 122. The mask calculation NN parameter is a parameter of an NN used by the mask calculator 102. The NN used in the cluster weight calculator 122 is referred to as a cluster weight calculation NN. The NN used by the mask calculator 102 is referred to as a mask calculation NN. θ is a set of the speaker feature extraction model parameters and the mask calculation NN parameters, and X is a set of the cluster weight calculation NN parameters.

The feature extractor 101 performs the same processing as that performed by the feature extractor 101a of the conventional target speaker extraction device 10a. In other words, the feature extractor 101 extracts the F-dimensional feature vectors from the first frame to the T-th frame from the observation signals. In other words, the feature extractor 101 extracts feature vectors of a predetermined order (F-dimension) in each frame from the observation signals. The feature extractor 101 extracts the features of the observation signals from the observed speech signals including at least speech of one or more speakers including the target speaker. If the observation signals include the speech of one speaker, they are assumed to include sound other than the speech, such as noise. If the observation signals include the speech of two or more speakers, they may or may not include noise.

The target speaker feature extractor 121 extracts target speaker features from speech signals of the target speaker serving as t adaptation data of the target speaker. The target speaker feature extractor 121 receives the signals for target speaker adaptation and outputs target speaker features $a^{(s)}$ using a predetermined calculation model specified by a speaker feature extraction model parameter $\theta^{(l)}$ for extracting the target speaker features stored in the storage unit 140.

Examples of the calculation model used by the target speaker feature extractor 121 include, but are not limited to, a model using ivector (reference: N. Dehak, P. Kenny, R. Dehak, P. Dumouchel, and P. Ouellet, "Front-end factor analysis for speaker verification", IEEE Trans. Audio, Speech, Language Process., vol. 19, no. 4, pp. 788-798, 2011), a model using Bottleneck features, a model using posterior probability of a speaker, etc. If the ID of the speaker is known or if the target speaker is a speaker included in the learning data, the target speaker feature extractor 121 may use a 1 hot vector indicating the ID of the speaker for calculation.

The cluster weight calculator 122 calculates the weights corresponding to respective clusters in the mask calculation NN (first neural network) with at least one of the layers divided into the clusters, based on the signals for target speaker adaptation using the cluster weight calculation NN (second neural network). The cluster weight calculator 122 receives the target speaker features and outputs the cluster weight based on the cluster weight calculation NN parameter $\lambda$ stored in the storage unit 140. The cluster weight calculator 122 calculates a vector $\alpha$ of the cluster weight as indicated by Expression (15). In Expression (15), h(•, $\lambda$) is a function indicating the NN for calculating the cluster weight from the features of speech. In other words, the cluster weight calculator 122 inputs the target speaker features to the NN (second neural network) supplied with the cluster weight calculation NN parameter $\lambda$, thereby obtaining and outputting the vector $\alpha$ of the cluster weight.

$$\alpha = h(a^{(s)}, \lambda) \quad (15)$$

The mask calculator 102 calculates a mask for extracting speech of the target speaker from the observation signals based on the features of the observation signals and the target speaker features. Based on the features of the observation signals, the mask calculator 102 calculates a mask using the mask calculator NN (first neural network) weighted by the weight calculated by the cluster weight calculator 122. The mask calculator 102 calculates the mask using Expression (14).

Expression (14) indicates calculation for the first layer of the neural network. $F_k^{(l)}$ is a function indicating calculation for the k-th hidden layer out of the hidden layers divided into multiple clusters. In Expression (14), $x_t^{(l-1)}$ is output of the (l−1)-th layer, and $x_t^{(0)}$ is input to the neural network, that is, the features Y(t,f) of the observation signals. In other words, Expression (14) indicates that the output (hidden state) $x_t^{(l)}$ from the layer divided into multiple clusters is determined based on the weighted sum resulting from weighting the output (hidden state) of the hidden layers obtained by inputting the output of the (l−1)-th layer to the respective divided hidden layers by the weights corresponding to the respective clusters calculated by the cluster weight calculator 122.

If another non-divided hidden layer is present in a stage following the l-th layer, calculation is carried out for the non-divided hidden layer. For the (l+1)-th layer, for example, $x_t^{(l)}$ is input and transformed into $x^{(l+1)}$ based on the transformation function $F^{(l+1)}$. By repeating this calculation by the number of times corresponding to the number of layers of the mask calculation NN, a mask is finally output. If the last layer is L, $x^{(L)}$ is the mask.

As described above, the mask calculator 102 calculates a mask using the hidden state resulting from weighting the hidden state corresponding to the output from the clusters in the mask calculation NN (first neural network) obtained by inputting the features of the observation signals to the NN by the weights corresponding to the respective clusters calculated by the cluster weight calculator 122.

The target signal calculator 103 performs the same processing as that performed by the target signal calculator 103a of the conventional target speaker extraction device 10a. In other words, the target signal calculator 103 calculates the signals of speech of the target speaker from the observation signals based on the mask. The target signal calculator 103, for example, calculates the signals of target speech based on the mask calculated by the mask calculator 102 and STFT of the observation signals calculated by the feature extractor 101.

Figure 4:
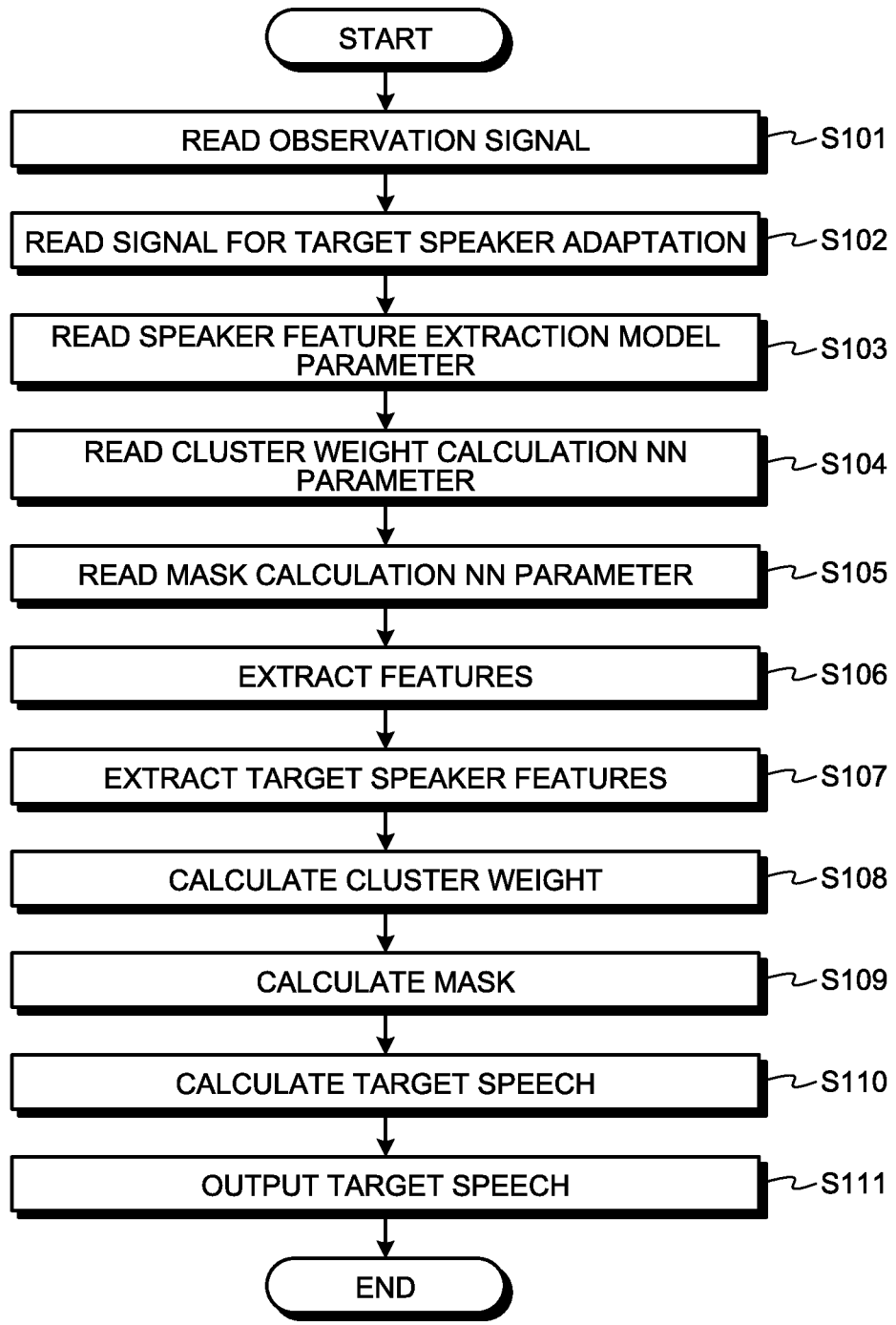
FIG. 4 is a flowchart of a process performed by the mask calculation device according to the first embodiment.

FIG. 4 is a flowchart of a process performed by the mask calculation device according to the first embodiment. As illustrated in FIG. 4, the feature extractor 101 reads the observation signals (Step S101). The target speaker feature extractor 121 reads the signals for target speaker adaptation (Step S102).

The target speaker feature extractor 121 reads the speaker feature extraction model parameter from the storage unit 140 (Step S103). The cluster weight calculator 122 reads the cluster weight calculation NN parameter from the storage unit 140 (Step S104). The mask calculator 102 reads the mask calculation NN parameter from the storage unit 140 (Step S105).

Subsequently, the feature extractor 101 extracts the features from the observation signals (Step S106). The target speaker feature extractor 121 extracts the target speaker features from the signals for target speaker adaptation (Step S107).

The cluster weight calculator 122 calculates the cluster weight based on the cluster weight calculation NN parameter and the target speaker features (Step S108). The mask calculator 102 calculates a mask based on the features and the mask calculation NN parameter (Step S109). The target signal calculator 103 uses the mask to calculate the signals of target speech from the observation signals (Step S110). Subsequently, the target signal calculator 103 outputs the calculated signals of target speech (Step S111).

Figure 5:
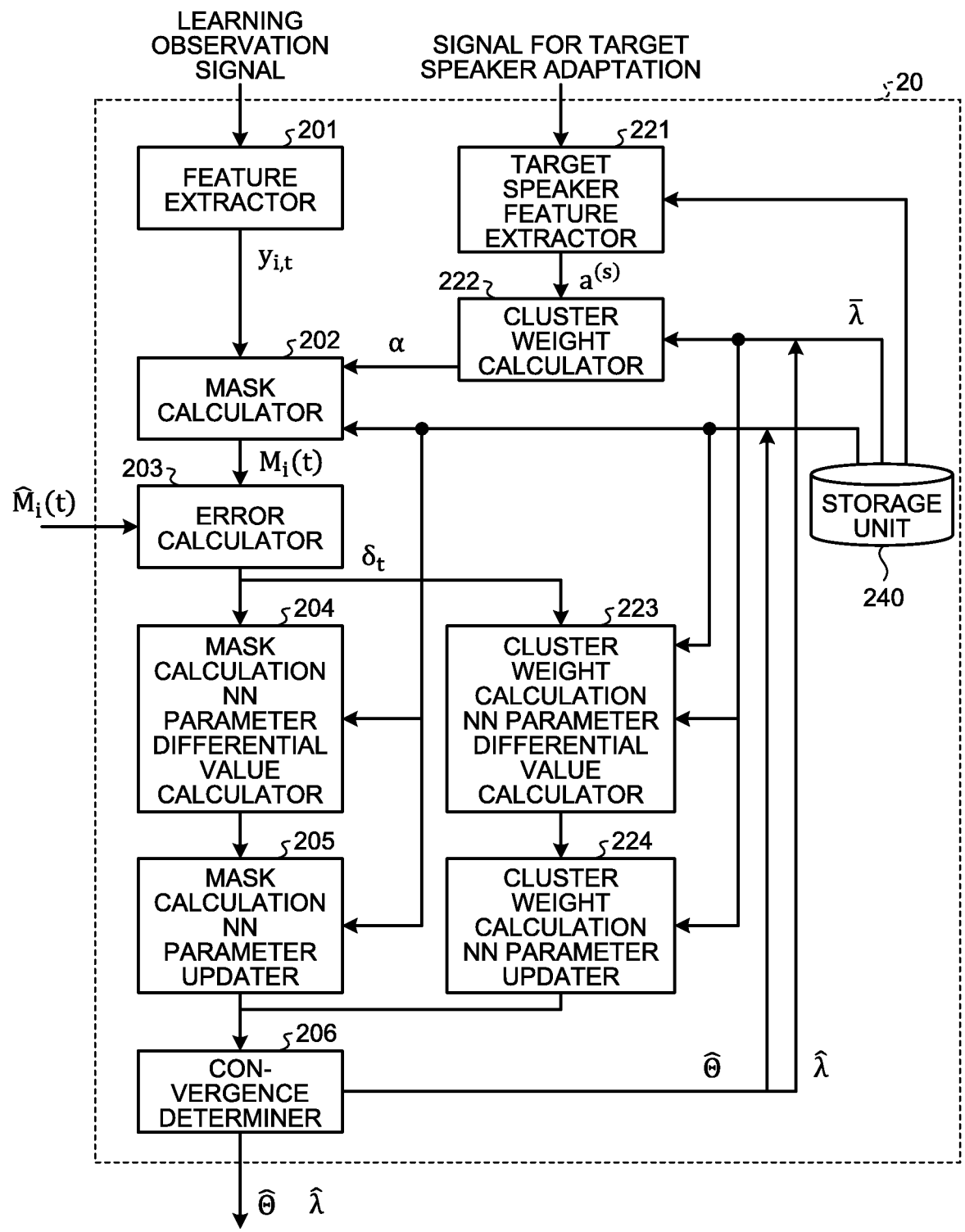
FIG. 5 is a diagram of an exemplary configuration of a mask calculation neural network learning device according to the first embodiment.

Mask Calculation Neural Network Learning Device According to the First Embodiment The following describes the configuration of the mask calculation neural network learning device according to the first embodiment with reference to FIG. 5. FIG. 5 is a diagram of an exemplary configuration of the mask calculation neural network learning device according to the first embodiment. As illustrated in FIG. 5, a mask calculation neural network learning device 20 includes a feature extractor 201, a mask calculator 202, an error calculator 203, a mask calculation NN parameter differential value calculator 204, a mask calculation NN parameter updater 205, a convergence determiner 206, a target speaker feature extractor 221, a cluster weight calculator 222, a cluster weight calculation NN parameter differential value calculator 223, a cluster weight calculation NN parameter updater 224, and a storage unit 240.

The feature extractor 201, the mask calculator 202, the target speaker feature extractor 221, and the cluster weight calculator 222 perform the same processing as that performed by the feature extractor 101, the mask calculator 102, the target speaker feature extractor 121, and the cluster weight calculator 122 of the mask calculation device 10.

In other words, the cluster weight calculator 222 calculates the weights corresponding to respective clusters in the mask calculation NN with at least one of the layers divided into the clusters, based on the signals of speech of a target speaker using the cluster weight calculation NN. The target speaker is the target speaker, for example. The mask calculator 202 calculates a mask for extracting the features of speech of the target speaker from the features in the observed speech signals of one or more speakers including the target speaker based on the features in the observed speech signals of the one or more speakers using the mask calculator NN weighted by the weights calculated by the cluster weight calculator 222. The mask calculation NN is an example of the first neural network. The cluster weight calculation NN is an example of the second neural network.

The storage unit 240 stores therein the speaker feature extraction model parameter used by the target speaker feature extractor 221, the cluster weight calculation NN parameter used by the cluster weight calculator 222, and the mask calculation NN parameter used by the mask calculator 202. At the start of learning, appropriate initial values (random initial values) are set for the speaker feature extraction model parameter, the cluster weight calculation NN parameter, and the mask calculation NN parameter.

The mask calculation neural network learning device 20 learns the mask calculation NN parameter and the cluster weight calculation NN parameter used by the mask calculation device 10, for example. The mask calculation neural network learning device 20 performs learning using learning observation signals, signals for adaptation, and a correct mask.

The mask calculation neural network learning device 20 performs learning by error backpropagation and stochastic gradient descent (SGD) (reference: S. Haykin, Neural Networks, "A Comprehensive Foundation," Prentice Hall PTR, Upper Saddle River, N.J., USA, 2nd edition, 1999). The error calculator 203 calculates an error $S_t$ based on a mask M(t) and a correct mask ^M(t) calculated by the mask calculation device 10 as indicated by Expression (16):

$$\delta_t = \hat{M}(t) - M(t) \quad (16)$$

The mask calculation neural network learning device 20 may perform learning by minimization criteria for the distortion and the distance of the calculated target speech and criteria for speech recognition without using any correct mask. The method employed in learning by the mask calculation neural network learning device 20 is not limited to the SGD. The mask calculation neural network learning device 20 may perform learning by Adam and Adagrad, for example.

The mask calculation NN parameter differential value calculator 204 considers the mask calculation NN and the cluster weight calculation NN as a connected NN and performs error backpropagation on the connected NN, thereby calculating a differential value of the parameter of the mask calculation NN. Based on the differential value of the parameter calculated by the mask calculation NN parameter differential value calculator 204, the mask calculation NN parameter updater 205 updates the parameter of the mask calculation NN. In other words, the mask calculation NN parameter updater 205 updates the value of the parameter of the mask calculation NN stored in the storage unit 240 with an updated value.

The mask calculation NN parameter updater 205 updates a mask calculation NN parameter $\hat{\theta}^{(l)}$ as indicated by Expression (17):

$$\hat{\theta}^{(l)} = \theta^{(l)} + \eta \frac{\partial J}{\partial \theta^{(l)}} \quad (17)$$

In Expression (17), $\hat{\theta}^{(l)}$ is a mask calculation NN parameter after being updated, $\theta^{(l)}$ is a mask calculation NN parameter before being updated, and ($\delta J/\delta \theta^{(l)}$) (the second term in the right side of Expression (17)) is a differential value of the parameter of the mask calculation NN calculated by the mask calculation NN parameter differential value calculator 204. J indicates an optimization criterion (e.g., cross entropy). η is a learning rate parameter and is a small value of substantially 0.1 to 0.0001, for example.

The cluster weight calculation NN parameter differential value calculator 223 performs error backpropagation on the connected NN, thereby calculating a differential value of the parameter of the cluster weight calculation NN. Based on the differential value of the cluster weight calculation NN parameter calculated by the cluster weight calculation NN parameter differential value calculator 223, the cluster weight calculation NN parameter updater 224 updates the parameter of the cluster weight calculation NN. In other words, the cluster weight calculation NN parameter updater 224 updates the value of the parameter of the cluster weight calculation NN stored in the storage unit 240 with an updated value.

The cluster weight calculation NN parameter updater 224 updates a cluster weight calculation NN parameter $\hat{\lambda}$ as indicated by Expression (18). In other words, the cluster weight calculation NN parameter updater 224 updates the value of the cluster weight calculation NN parameter stored in the storage unit 240 with an updated value.

$$\hat{\lambda} = \lambda + \eta' \frac{\partial J}{\partial \lambda} \quad (18)$$

In Expression (18), $\hat{\lambda}$ is a cluster weight calculation NN parameter after being updated, $\lambda$ is a cluster weight calculation NN parameter before being updated, and ($\delta J/\delta \lambda$) (the second term in the right side of Expression (18)) is a differential value of the parameter of the cluster weight calculation NN calculated by the cluster weight calculation NN parameter differential value calculator 223. J indicates an optimization criterion (e.g., cross entropy). η' is a learning rate parameter and is a small value of substantially 0.1 to 0.0001, for example.

The convergence determiner 206 receives a model parameter group and determines whether learning of the model parameters has converged. If the convergence determiner 206 determines that the model parameters have converged, the convergence determiner 206 outputs the model parameters in the convergence as the output value of the mask calculation neural network learning device 20. The model parameters include the mask calculation NN parameter and the cluster weight calculation NN parameter.

If the convergence determiner 206 determines that the model parameters have not converged yet, the convergence determiner 206 outputs control signals to cause the cluster weight calculator 222, the mask calculator 202, the error calculator 203, the mask calculation NN parameter differential value calculator 204, the mask calculation NN parameter updater 205, the cluster weight calculation NN parameter differential value calculator 223, and the cluster weight calculation NN parameter updater 224 to repeat the processing described above.

When the difference between the parameters before and after being updated is equal to or smaller than a threshold, when the number of times of repetition is equal to or larger than a predetermined number of times, or when the performance of the model deteriorates in evaluation of the performance using part of learning speech, for example, the convergence determiner 206 determines that the model parameters have converged. In other words, the convergence determiner 206 performs control to cause the cluster weight calculator 222 to repeat estimating the mask and updating the parameter of the NN until the mask calculated by the NN based on the model parameters in the storage unit 240 satisfies a predetermined criterion. If the mask satisfies the predetermined condition, the mask calculation neural network learning device 20 ends the learning. The value of the parameter of the NN stored in the storage unit 240 at this time corresponds to the parameter of the NN after the learning.

Figure 6:
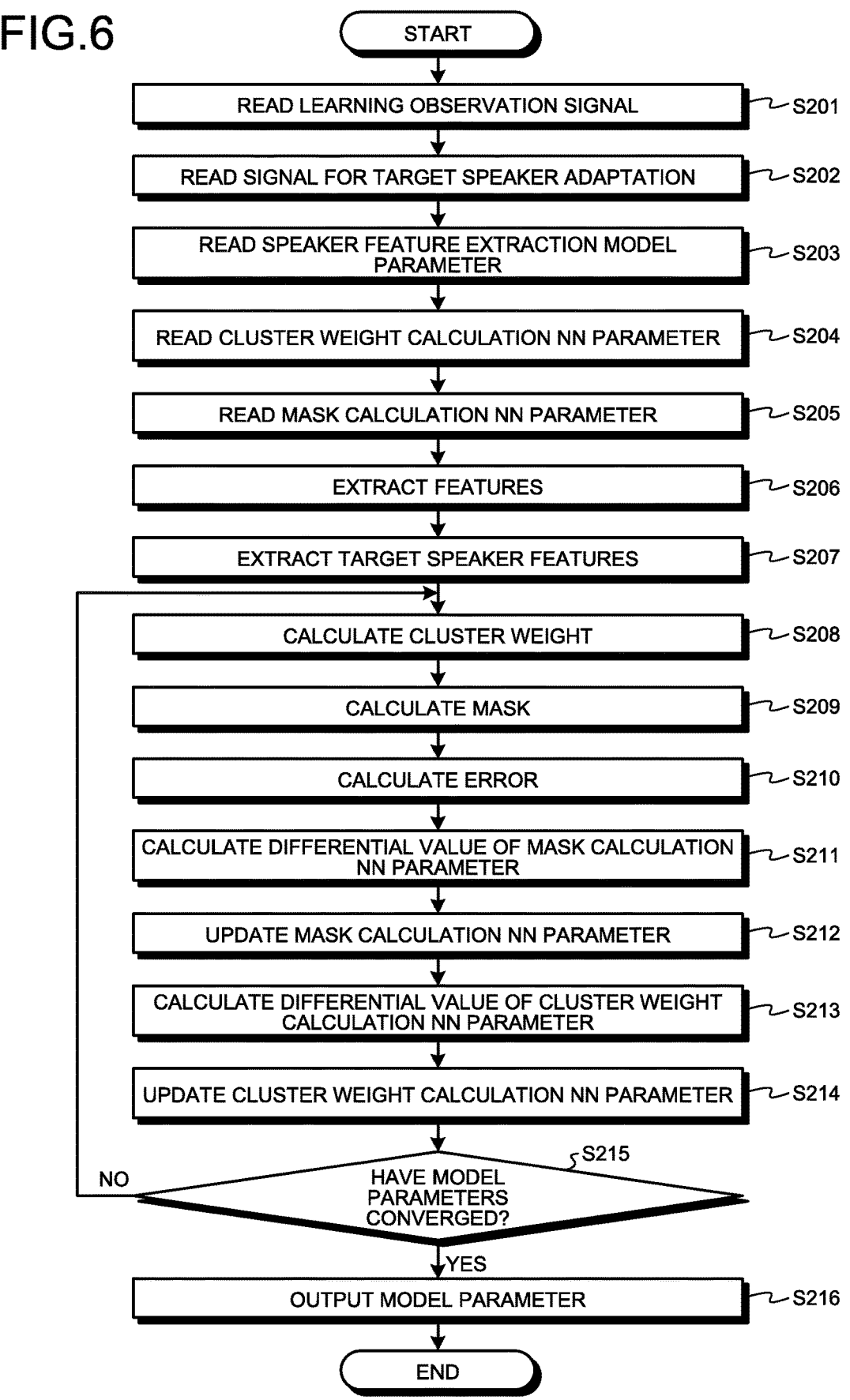
FIG. 6 is a flowchart of a process performed by the mask calculation neural network learning device according to the first embodiment.

FIG. 6 is a flowchart of a process performed by the mask calculation neural network learning device according to the first embodiment. As illustrated in FIG. 6, the feature extractor 201 reads the observation signals (Step S201). The target speaker feature extractor 221 reads the signals for target speaker adaptation (Step S202).

The target speaker feature extractor 221 reads the speaker feature extraction model parameter from the storage unit 240 (Step S203). The cluster weight calculator 222 reads the cluster weight calculation NN parameter from the storage unit 240 (Step S204). The mask calculator 202 reads the mask calculation NN parameter from the storage unit 240 (Step S205).

Subsequently, the feature extractor 201 extracts the features from the observation signals (Step S206). The target speaker feature extractor 221 extracts the target speaker features from the signals for target speaker adaptation (Step S207).

The cluster weight calculator 222 calculates the cluster weight based on the cluster weight calculation NN parameter and the target speaker features (Step S208). The mask calculator 202 calculates a mask based on the features and the mask calculation NN parameter (Step S209). The error calculator 203 calculates an error based on the mask and the correct mask calculated by the mask calculator 202 (Step S210).

The mask calculation NN parameter differential value calculator 204 calculates a differential value of the mask calculation NN parameter (Step S211). The mask calculation NN parameter updater 205 updates the mask calculation NN parameter (S212).

The cluster weight calculation NN parameter differential value calculator 223 calculates a differential value of the cluster weight calculation NN parameter (Step S213). The cluster weight calculation NN parameter updater 224 updates the cluster weight calculation NN parameter (Step S214).

The convergence determiner 206 determines whether the model parameters have converged (Step S215). If the convergence determiner 206 determines that the model parameters have not converged yet (No at Step S215), the convergence determiner 206 causes the processing units to perform the processing from Step S208 to Step S214 again. If the convergence determiner 206 determines that the model parameters have converged (Yes at Step S215), the convergence determiner 206 outputs the model parameters (Step S216).

Advantageous Effects of the First Embodiment

The feature extractor 101 extracts features from the observed speech signals including at least speech of one or more speakers including a target speaker. The target speaker feature extractor 121 extracts target speaker features from the signals for target speaker adaptation serving as the signals of speech of the target speaker. The mask calculator 102 calculates a mask for extracting speech of the target speaker from the observation signals based on the features of the observation signals and the target speaker features. The target signal calculator 103 calculates the signals of speech of the target speaker from the observation signals based on the mask. As described above, the present embodiment uses a mask calculated from the target speaker features. If the observed speech includes speech of multiple speakers, the present embodiment can extract the speech of the target speaker.

The target speaker feature extractor 121 extracts the speech features of a target speaker from the signals of speech of the target speaker. The cluster weight calculator 122 calculates the weights corresponding to respective clusters in the mask calculation NN with at least one of the layers divided into the clusters by inputting the features extracted by the target speaker feature extractor 121 to the cluster weight calculation NN. The mask calculator 102 calculates a mask for extracting the features of speech of the target speaker from the features in the observed speech signals of one or more speakers including the target speaker based on the features of the observed speech signals of one or more speakers using the mask calculator NN weighted by the weights calculated by the cluster weight calculator. As described above, the present embodiment weights the cluster corresponding to the speech of the target speaker in the layer divided into multiple clusters out of the layers of the NN used for mask calculation. If the observed speech includes speech of multiple speakers, the present embodiment can extract the speech of the target speaker.

The cluster weight calculator 222 calculates weights corresponding to respective clusters in the mask calculation NN with at least one of the layers divided into the clusters, based on the signals of speech of a target speaker using the cluster weight calculation NN. The mask calculator 202 calculates a mask for extracting the features of speech of the target speaker from the features of the observed speech signals of one or more speakers including the target speaker based on the features of the observated speech signals of the one or more speakers using the mask calculator NN weighted by the weights calculated by the cluster weight calculator 222. The mask calculation NN parameter differential value calculator 204 considers the mask calculation NN and the cluster weight calculation NN as a connected NN and performs error backpropagation on the connected NN, thereby calculating a differential value of the parameter of the mask calculation NN. Based on the differential value of the parameter calculated by the mask calculation NN parameter differential value calculator 204, the mask calculation NN parameter updater 205 updates the parameter of the mask calculation NN. The cluster weight calculation NN parameter differential value calculator 223 performs error backpropagation on the connected NN, thereby calculating a differential value of the parameter of the cluster weight calculation NN. Based on the differential value of the cluster weight calculation NN parameter calculated by the cluster weight calculation NN parameter differential value calculator 223, the cluster weight calculation NN parameter updater 224 updates the parameter of the cluster weight calculation NN. As described above, the present embodiment can optimize the parameters simultaneously by connecting the NN used for mask calculation and the NN used for cluster weight calculation.

Second Embodiment

The mask calculation device according to a second embodiment is described below. As illustrated in FIG. 3, the first embodiment calculates the cluster weight based on the target speaker features extracted from the signals for target speaker adaptation. The second embodiment calculates the cluster weight directly from the speech signals of the target speaker serving as adaptation data.

Mask Calculation Device According to the Second Embodiment

Figure 7:
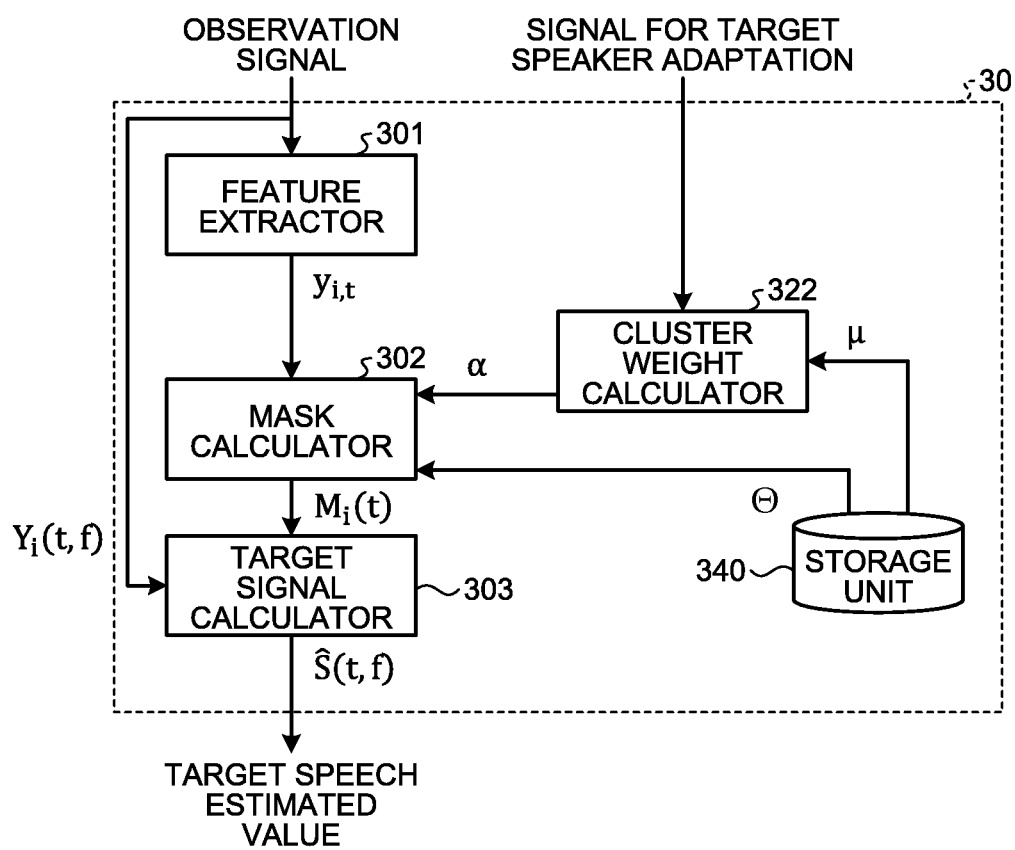
FIG. 7 is a diagram of an exemplary configuration of the mask calculation device according to a second embodiment.

The configuration of the mask calculation device according to the second embodiment is described with reference to FIG. 7. FIG. 7 is a diagram of an exemplary configuration of the mask calculation device according to the second embodiment. As illustrated in FIG. 7, a mask calculation device 30 includes a feature extractor 301, a mask calculator 302, a target signal calculator 303, a cluster weight calculator 322, and a storage unit 340.

The feature extractor 301, the mask calculator 302, and the target signal calculator 303 perform the same processing as that performed by the feature extractor 101, the mask calculator 102, and the target signal calculator 103 of the mask calculation device 10. In other words, the mask calculator 302 calculates a mask for extracting the features of speech of a target speaker from the features in the observation signals of speech of one or more speakers including the target speaker based on the features in the observed speech signals of the one or more speakers using the mask calculator NN weighted by the weights calculated by the cluster weight calculator 322.

Examples of the features extracted by the feature extractor 301 include, but are not limited to, mel frequency cepstral coefficient (MFCC), log mel filterbank coefficients (LMFC), ΔMFCC (obtained by differentiating MFCC once), ΔΔMFCC (obtained by differentiating MFCC twice), logarithmic power, Δlogarithmic power (obtained by differentiating logarithmic power once), etc. The feature extractor 301 may extract a combination of multiple features.

While the cluster weight calculator 122 of the mask calculation device 10 calculates the cluster weight based on the target speaker features, the cluster weight calculator 322 calculates the cluster weight based on the signals for target speaker adaptation. In other words, the cluster weight calculator 322 calculates the weights corresponding to respective clusters in the mask calculation NN with at least one of the layers divided into the clusters, based on the signals of speech of the target speaker using the cluster weight calculation NN.

The cluster weight calculator 322 receives a signal for target speaker adaptation $S_t^{(s)}$ and calculates and outputs the cluster weight by the NN with a cluster weight calculation NN parameter μ. The cluster weight calculator 322 calculates a vector α of the cluster weight as indicated by Expression (19). In Expression (19), l(•, μ) is the NN for calculating the cluster weight from the speech signals.

$$\alpha = \frac{1}{T}\sum_{1}^{T} l(s_t^{(s)}, \mu) \quad (19)$$

The signal for target speaker adaptation $S_t^{(s)}$ may be a set of speech features of speech data including only the speech of the target speaker. The cluster weight calculator 322 defines time-average output as the weight vector α of the cluster.

The storage unit 340 stores therein the cluster weight calculation NN parameter used by the cluster weight calculator 322 and the mask calculation NN parameter used by the mask calculator 302.

Figure 8:
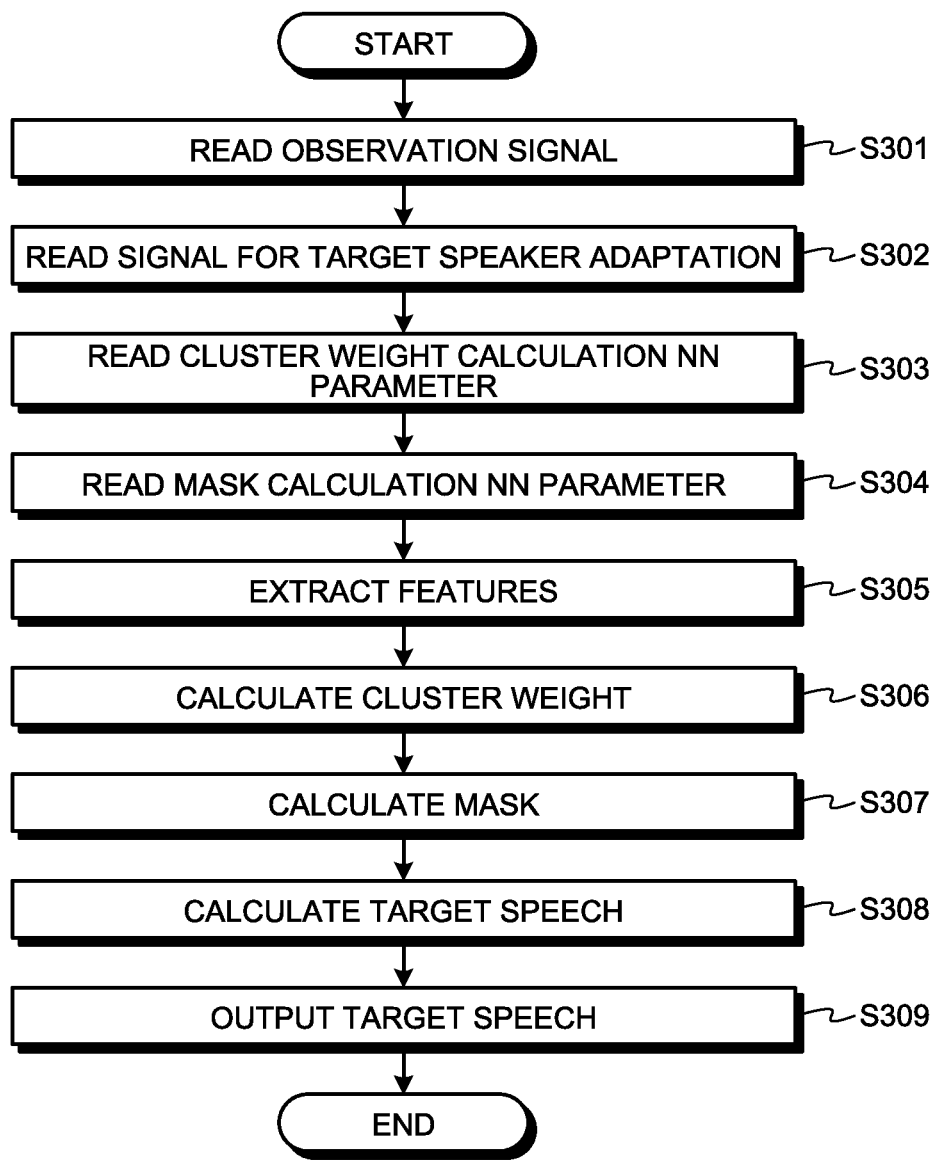
FIG. 8 is a flowchart of a process performed by the mask calculation device according to the second embodiment.

FIG. 8 is a flowchart of a process performed by the mask calculation device according to the second embodiment. As illustrated in FIG. 8, the feature extractor 301 reads the observation signals (Step S301). The cluster weight calculator 322 reads the signals for target speaker adaptation (Step S302).

The cluster weight calculator 322 reads the cluster weight calculation NN parameter from the storage unit 340 (Step S303). The mask calculator 302 reads the mask calculation NN parameter from the storage unit 340 (Step S304).

Subsequently, the feature extractor 301 extracts the features from the observation signals (Step S305). The cluster weight calculator 322 calculates the cluster weight based on the cluster weight calculation NN parameter and the signals for target speaker adaptation (Step S306). The mask calculator 302 calculates a mask based on the features and the mask calculation NN parameter (Step S307). The target signal calculator 303 uses the mask to calculate the signals of target speech from the observation signals (Step S308). Subsequently, the target signal calculator 303 outputs the calculated signals of target speech (Step S309).

Advantageous Effects of the Second Embodiment

The cluster weight calculator 322 calculates the weights corresponding to respective clusters in the mask calculation NN with at least one of the layers divided into the clusters, based on the signals of speech of a target speaker using the cluster weight calculation NN. The mask calculator 302 calculates a mask for extracting the features of speech of a target speaker from the features in the observation signals of speech of one or more speakers including the target speaker based on the features in the observed speech signals of the one or more speakers using the mask calculator NN weighted by the weights calculated by the cluster weight calculator 322. The present embodiment does not require any parameter for extracting the target speaker features or needs not carry out calculation for extracting the target speaker features. Consequently, the present embodiment can carry out mask calculation in a simpler manner.

Third Embodiment

A cluster weight learning device according to a third embodiment is described below. The mask calculation neural network learning device 20 according to the first embodiment learns the cluster weight calculation NN parameter and the mask calculation NN parameter. The cluster weight learning device according to the third embodiment re-estimates the cluster weight in the same manner as the learning performed by the mask calculation neural network learning device 20.

If the features of the target speaker is significantly different from features of the speaker in the learning data, for example, the cluster weight calculated by the cluster weight calculator 122 according to the first embodiment may possibly fail to calculate a mask capable of extracting the target speech accurately. In this case, the cluster weight learning device according to the third embodiment can re-estimate the cluster weight and increase the accuracy of speech extraction.

Cluster Weight Learning Device According to the Third Embodiment

Figure 9:
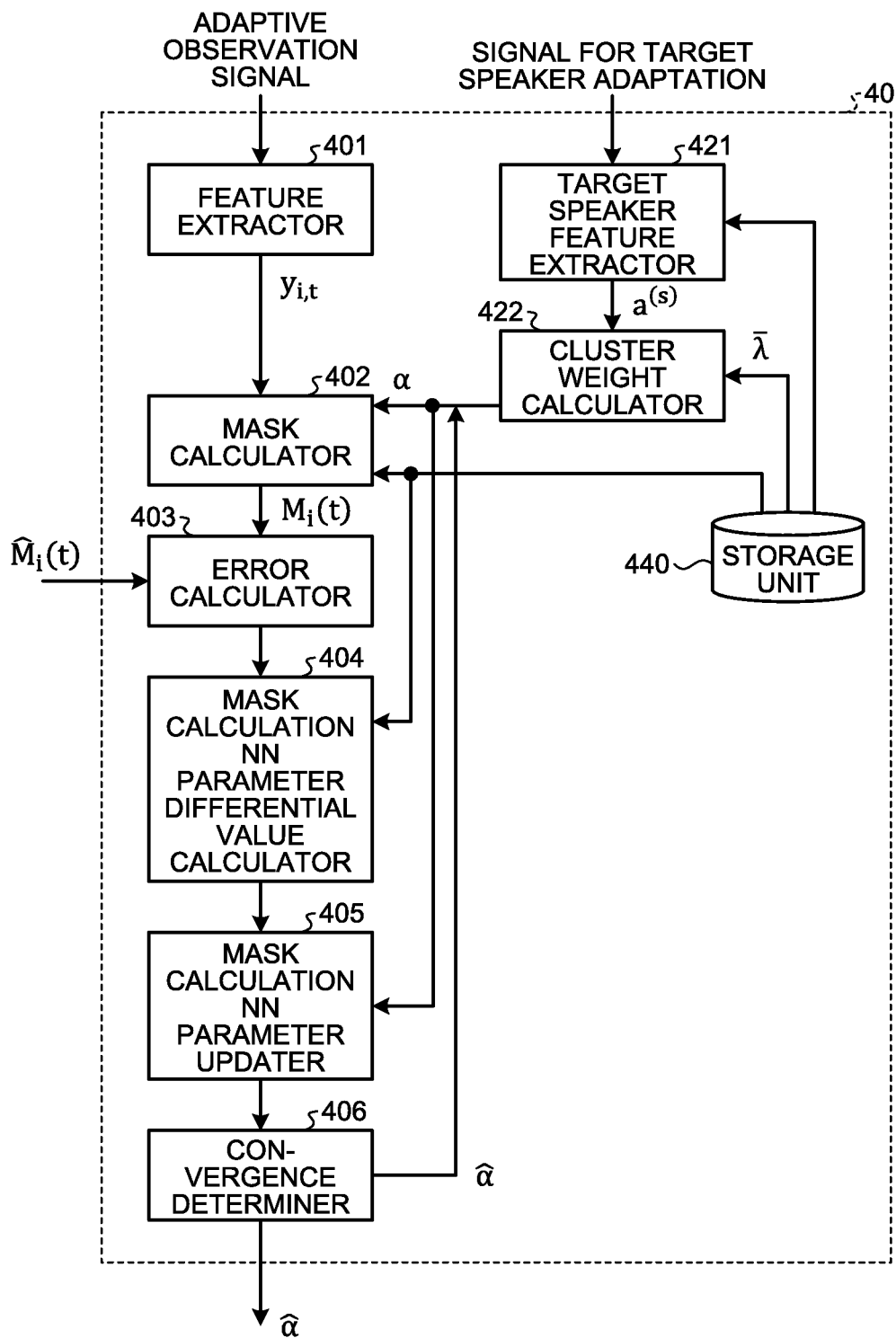
FIG. 9 is a diagram of an exemplary configuration of a cluster weight learning device according to a third embodiment.

The following describes the configuration of the cluster weight learning device according to the third embodiment with reference to FIG. 9. FIG. 9 is a diagram of an exemplary configuration of the cluster weight learning device according to the third embodiment. As illustrated in FIG. 9, a cluster weight learning device 40 includes a feature extractor 401, a mask calculator 402, an error calculator 403, a cluster weight differential value calculator 404, a cluster weight updater 405, a convergence determiner 406, target speaker feature extractor 421, a cluster weight calculator 422, and a storage unit 440.

The feature extractor 401, the mask calculator 402, the error calculator 403, the target speaker feature extractor 421, and the cluster weight calculator 422 perform the same processing as that performed by the feature extractor 201, the mask calculator 202, the error calculator 203, the target speaker feature extractor 221, and the cluster weight calculator 222 of the mask calculation neural network learning device 20.

In other words, the cluster weight calculator 422 calculates the weights corresponding to respective clusters in the mask calculation NN with at least one of the layers divided into the clusters, based on the signals of speech of a target speaker using the cluster weight calculation NN.

The mask calculator 402 calculates a mask for extracting the features of speech of the target speaker from the features in the observed speech signals of one or more speakers including the target speaker based on the features in the observed speech signals of the one or more speakers using the mask calculator NN weighted by the weights calculated by the cluster weight calculator 422.

The storage unit 440 stores therein the speaker feature extraction model parameter used by the target speaker feature extractor 421, the cluster weight calculation NN parameter used by the cluster weight calculator 422, and the mask calculation NN parameter used by the mask calculator 402.

The cluster weight learning device 40 re-estimates the cluster weight in the same manner as the method for learning the mask calculation NN parameter by the mask calculation neural network learning device 20, for example. The cluster weight learning device 40 can determine a mask capable of extracting speech of the target speaker from speech data created by mixing the speech of the target speaker and the speech of other speakers as a correct mask. An observation signal created by mixing the speech of the target speaker and the speech of other speakers is referred to as an adaptive observation signal.

The cluster weight differential value calculator 404 considers the mask calculation NN and the cluster weight calculation NN as a connected NN and performs error backpropagation on the connected NN, thereby calculating a differential value of the weight. Based on the differential value of the cluster weight calculated by the cluster weight differential value calculator 404, the cluster weight updater 405 updates the cluster weight.

The convergence determiner 406 determines whether the cluster weights have converged. If the convergence determiner 406 determines that the cluster weights have converged, the convergence determiner 406 outputs the cluster weights in the convergence as the output value of the cluster weight learning device 40.

If the convergence determiner 406 determines that the cluster weights have not converged yet, the convergence determiner 406 outputs the updated cluster weights to the mask calculator 402. The convergence determiner 406 outputs control signals to cause the mask calculator 402, the error calculator 403, the cluster weight differential value calculator 404, and the cluster weight updater 405 to repeat the processing described above.

Figure 10:
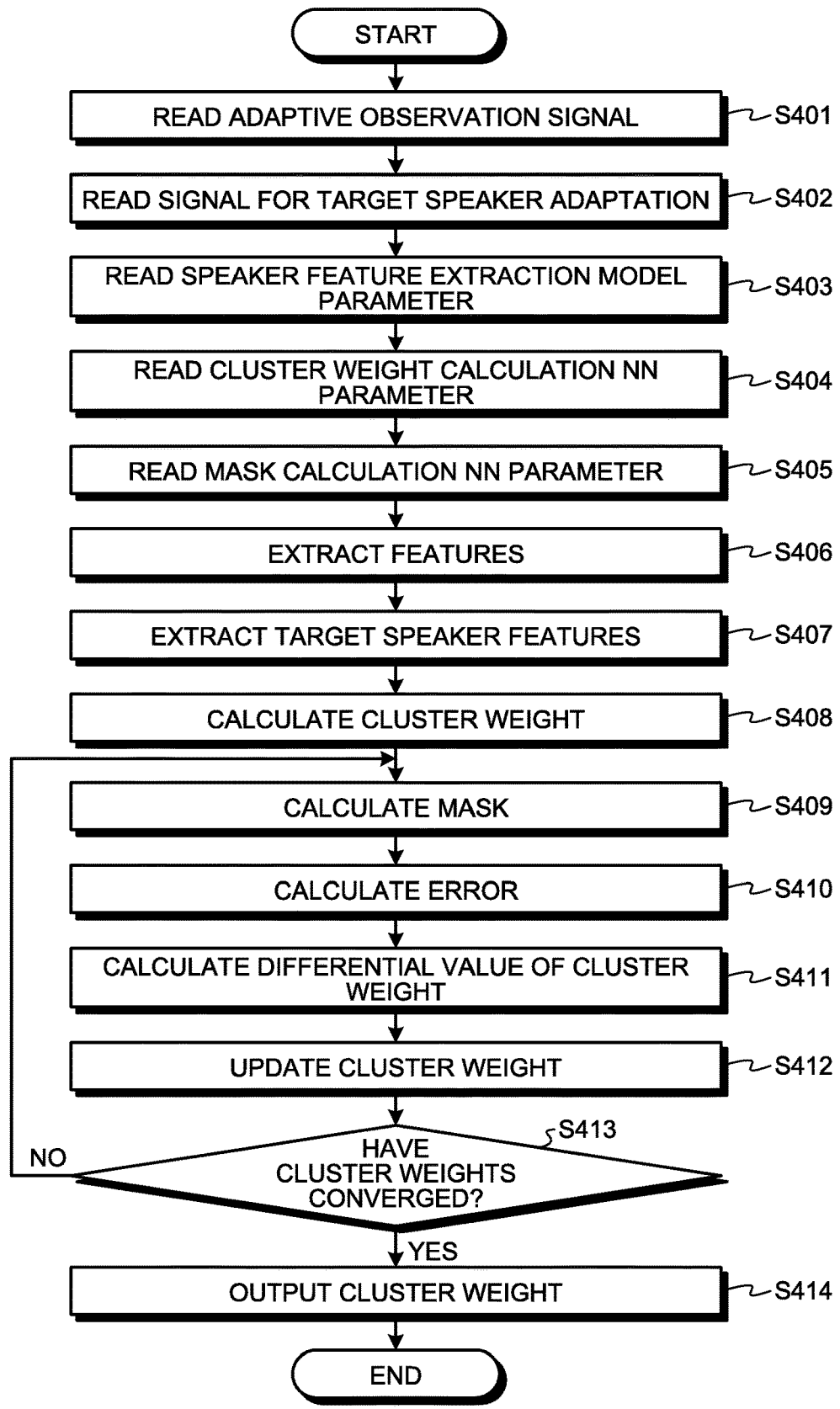
FIG. 10 is a flowchart of a process performed by the cluster weight learning device according to the third embodiment.

FIG. 10 is a flowchart of a process performed by the cluster weight learning device according to the third embodiment. As illustrated in FIG. 10, the feature extractor 401 reads the adaptive observation signals (Step S401). The target speaker feature extractor 421 reads the signals for target speaker adaptation (Step S402).

The target speaker feature extractor 421 reads the speaker feature extraction model parameter from the storage unit 440 (Step S403). The cluster weight calculator 422 reads the cluster weight calculation NN parameter from the storage unit 440 (Step S404). The mask calculator 402 reads the mask calculation NN parameter from the storage unit 440 (Step S405).

Subsequently, the feature extractor 401 extracts the features from the observation signals (Step S406). The target speaker feature extractor 421 extracts the target speaker features from the signals for target speaker adaptation (Step S407).

The cluster weight calculator 422 calculates the cluster weight based on the cluster weight calculation NN parameter and the target speaker features (Step S408). The mask calculator 402 calculates a mask based on the features and the mask calculation NN parameter (Step S409). The error calculator 403 calculates an error based on the mask and the correct mask calculated by the mask calculator 402 (Step S410).

The cluster weight differential value calculator 404 calculates a differential value of the cluster weight (Step S411). The cluster weight updater 405 updates the cluster weight (S412).

The convergence determiner 406 determines whether the cluster weights have converged (Step S413). If the convergence determiner 406 determines that the cluster weights have not converged yet (No at Step S413), the convergence determiner 406 causes the processing units to perform the processing from Step S409 to Step S412 again. If the convergence determiner 406 determines that the cluster weights have converged (Yes at Step S413), the convergence determiner 406 outputs the cluster weights (Step S414).

Advantageous Effects of the Third Embodiment

The cluster weight calculator 422 calculates the weights corresponding to respective clusters in the mask calculation NN with at least one of the layers divided into the clusters, based on the speech signals of a target speaker using the cluster weight calculation NN. The mask calculator 402 calculates a mask for extracting the features of speech of the target speaker from the features in the observed speech signals of one or more speakers including the target speaker based on the features in the observed speech signals of the one or more speakers using the mask calculator NN weighted by the weights calculated by the cluster weight calculator 422. The cluster weight differential value calculator 404 considers the mask calculation NN and the cluster weight calculation NN as a connected NN and performs error backpropagation on the connected NN, thereby calculating a differential value of the weight. Based on the differential value of the cluster weight calculated by the cluster weight differential value calculator 404, the cluster weight updater 405 updates the cluster weight. If an accurate mask fails to be derived by one calculation, the present embodiment can increase the accuracy of the mask by re-estimating the cluster weight.

Comparison Between the Present Invention and the Conventional Technique

Table 1 indicates the results of an experiment of speech extraction using the embodiments of the present invention and the conventional technique. The cepstral distance (dB) in Table 1 is a cepstral distance between a signal of extracted target speech and a signal of actual target speech. As the speech extraction accuracy is higher, the cepstral distance is smaller.

TABLE 1

|  | Cepstral distance (dB) |
|---|---|
| Observed speech | 5.23 |
| Baseline | 5.86 |
| Present invention (ivector) | 3.91 |
| Present invention (posterior probability of speaker) | 4.11 |
| Present invention (adaptation) | 3.86 |
| Present invention (sequence summary) | 3.67 |

The purpose of the present experiment is to extract only the speech of a target speaker from observation signals including mixed speech of two speakers. In the present experiment, the speech is observed by eight microphones, and the output signals of the target speech are calculated by a beamformer. In the present experiment, the mask calculation NN includes a BLSTM layer, two fully connected layers having a Relu function as an activation function, and a fully connected layer having a sigmoid function as an activation function.

"Observed speech" in table 1 indicates a result obtained when no speech extraction was performed. As indicated in Table 1, the cepstral distance obtained when no speech extraction was performed was 5.23. "Baseline" in table 1 indicates a result obtained when speech extraction was performed using the conventional target speaker extraction device 10a. As indicated in Table 1, the cepstral distance of "Baseline" was 5.86. As described above, the cepstral distance was not improved by the conventional target speaker extraction device 10a compared with the observation signals.

"Present invention (ivector)" in table 1 indicates a result obtained when the first embodiment of the present invention extracted the target speaker features using ivector and performed speech extraction. As indicated in Table 1, the cepstral distance of "Present invention (ivector)" was 3.91.

"Present invention (posterior probability of speaker)" in table 1 indicates a result obtained when the first embodiment of the present invention extracted the target speaker features using the posterior probability of the speaker and performed speech extraction. As indicated in Table 1, the cepstral distance of "Present invention (posterior probability of speaker)" was 4.11.

"Present invention (adaptation)" in table 1 indicates a result obtained when the cluster weight was calculated using the mask calculation device 10 according to the first embodiment of the present invention and re-estimated using the cluster weight learning device 40 according to the third embodiment of the present invention, and then speech extraction was performed. As indicated in Table 1, the cepstral distance of "Present invention (adaptation)" was 3.86.

"Present invention (sequence summary)" in table 1 indicates a result obtained when speech extraction was performed using the mask calculation device 30 according to the second embodiment of the present invention. As indicated in Table 1, the cepstral distance of "Present invention (sequence summary)" was 3.67.

As indicated in Table 1, the cepstral distance was not improved by the conventional target speaker extraction device 10a compared with the observation signals but was improved by the methods according to the embodiments above. Consequently, the embodiments of the present invention are effective in increasing the accuracy of target speech extraction.

System Configuration and Others

The components of the devices illustrated in the figures are functionally conceptual and are not necessarily physically configured as illustrated in the figures. In other words, the target aspects of distribution and integration of the devices are not limited to those illustrated in the figures. All or part of the components may be distributed or integrated functionally or physically in desired units depending on various kinds of loads and uses, for example. All or desired part of the processing functions implemented by the devices may be provided by a CPU and a computer program analyzed and executed by the CPU or as hardware by wired logic.

All or part of the automatically performed processing out of the processing described in the embodiments above may be performed manually. Alternatively, all or part of the manually performed processing may be performed automatically by a known method. In addition, the processing procedures, the control procedures, the target names, and the information including various kinds of data and parameters described above and illustrated in the figures can be optionally changed unless otherwise specified.

Computer Programs

The mask calculation device 10 according to one embodiment can be implemented by installing a mask calculation program for carrying out the mask calculation described above in a desired computer as package software or online software. An information processing device, for example, can serve as the mask calculation device 10 by executing the mask calculation program. Examples of the information processing device include, but are not limited to, desktop or laptop personal computers, etc. In addition, examples of the information processing device include, but are not limited to, mobile communication terminals such as smartphones, mobile phones, and personal handy-phone systems (PHS), slate terminals such as personal digital assistants (PDA), etc.

The mask calculation device 10 may be implemented as a mask calculation server device that provides services relating to the mask calculation described above to a client corresponding to a terminal device used by a user. The mask calculation device 10 is implemented as a server device that provides a mask calculation service of receiving the observation signals and the signals for target speaker adaptation and outputting a mask for extracting the signals of target speech, for example. In this case, the mask calculation server device may be implemented as a Web server or a cloud system that provides services relating to the mask calculation by outsourcing.

Figure 11:
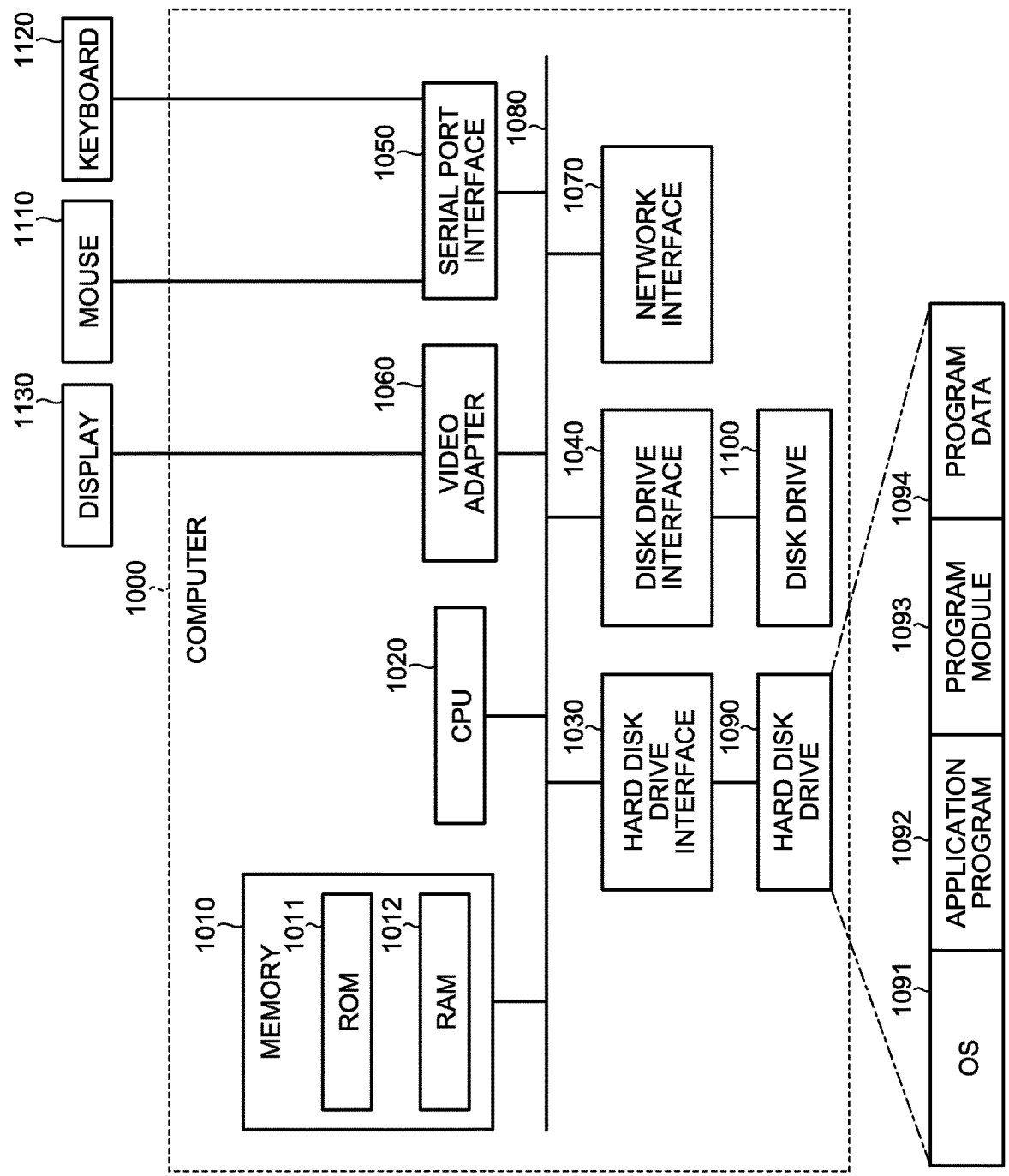
FIG. 11 is a diagram of an example of a computer that executes a computer program.

FIG. 11 is a diagram of an example of a computer that executes a computer program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores therein a boot program, such as a basic input output system (BIOS). The hard disk drive interface 1030 is connected to a hard disk drive 1090. The disk drive interface 1040 is connected to a disk drive 1100. A detachable storage medium, such as a magnetic disk and an optical disc, is inserted into the disk drive 1100. The serial port interface 1050 is connected to a mouse 1110 and a keyboard 1120, for example. The video adapter 1060 is connected to a display 1130, for example.

The hard disk drive 1090 stores therein an OS 1091, an application program 1092, a program module 1093, and program data 1094, for example. In other words, the computer program that defines the processing performed by the mask calculation device 10 is implemented as the program module 1093 that describes codes executable by the computer. The program module 1093 is stored in the hard disk drive 1090, for example. The program module 1093 for performing the same processing as the functional configuration in the mask calculation device 10, for example, is stored in the hard disk drive 1090. The hard disk drive 1090 may be replaced by an SSD.

The setting data used in the processing according to the embodiments above is stored in the memory 1010 and the hard disk drive 1090, for example, as the program data 1094. The CPU 1020 reads and executes the program module 1093 and the program data 1094 stored in the memory 1010 and the hard disk drive 1090 on the RAM 1012 as needed.

The program module 1093 and the program data 1094 are not necessarily stored in the hard disk drive 1090 and may be stored in a detachable storage medium and read by the CPU 1020 via the disk drive 1100, for example. Alternatively, the program module 1093 and the program data 1094 may be stored in a second computer connected via a network (e.g., a local area network (LAN) and a wide area network (WAN)). The program module 1093 and the program data 1094 may be read from the second computer by the CPU 1020 via the network interface 1070.

The program module 1093 may be a computer program that defines the processing performed by at least one of the mask calculation device 10, the mask calculation neural network learning device 20, the mask calculation device 30, and the cluster weight learning device 40.

REFERENCE SIGNS LIST

10, 30 mask calculation device
20 mask calculation neural network learning device
40 cluster weight learning device
101, 201, 301, 401 feature extractor
102, 202, 302, 402 mask calculator
103, 303 target signal calculator
121, 221, 421 target speaker feature extractor
122, 222, 322, 422 cluster weight calculator
140, 240, 340, 440 storage unit
203, 403 error calculator
204 mask calculation NN parameter differential value calculator
205 mask calculation NN parameter updater
206, 406 convergence determiner
223 cluster weight calculation NN parameter differential value calculator
224 cluster weight calculation NN parameter updater
404 cluster weight differential value calculator
405 cluster weight updater

The invention claimed is:

1. A mask calculation device comprising:
a memory; and
a processor coupled to the memory and programmed to execute a process comprising:
extracting features from an observed speech signal including at least overlapped speech of a plurality of speakers including a target speaker;
extracting, separately from said extracting the features from the observed speech signal, features from a speech signal of the target speaker serving as adaptation data of the target speaker, the speech signal of a target signal being provided separately from the observed speech signal, the mask being a time-frequency mask for extracting the target signal from an observation signal, with respect to each time-frequency bin;
calculating a mask for extracting speech of the target speaker from the observed speech signal based on the features of the observed speech signal and the features of the speech signal of the target speaker; and
calculating the signal of the speech of the target speaker from the observed speech signal based on the mask,
wherein the observed speech signal from which the features of the observed speech signal are extracted is a same observed speech signal as the observed speech signal from which the signal of the speech of the target speaker is calculated, and
the calculating a mask includes receiving feature vector series of the observation signal, and outputting a mask for extracting a noise signal besides the mask for extracting the target signal to integrate the mask for extracting the noise signal obtained as output,
wherein the process further includes calculating a spatial correlation matrix of the noise signal, using the integration mask.

2. The mask calculation device according to claim 1, wherein the processor is further programmed to execute:
calculating weights corresponding to respective clusters in a first neural network with at least one of layers divided into the clusters, based on the signal for target speaker adaptation using a second neural network, wherein
the calculating the mask calculates the mask based on the features of the observed speech signal using the first neural network weighted by the weights calculated by the calculating the weights.

3. The mask calculation device according to claim 2, wherein the calculating the mask calculates the mask using a hidden state resulting from weighting a hidden state corresponding to output from the clusters obtained by inputting the features of the observed signal to the first neural network by the weights corresponding to the respective clusters calculated by the calculating the weights.

4. A cluster weight learning device comprising:
a memory; and
a processor coupled to the memory and programmed to execute a process comprising:
calculating weights corresponding to respective clusters in a first neural network with at least one of layers divided into the clusters, based on a signal of speech of a target speaker using a second neural network;
extracting, separately from said calculating the weights, features in an observed signal including at least overlapped speech of a plurality of speakers including the target speaker;
calculating a mask for extracting features of the speech of the target speaker from the features in the observed signal of the speech of the plurality of speakers based on the features in the observed signal of the speech of the plurality of speakers using the first neural network weighted by the weights calculated by the calculating the weights, the signal of the speech of the target speaker being provided separately from the observed signal of the speech of the plurality of speakers, the mask being a time-frequency mask for extracting the target signal from an observation signal, with respect to each time-frequency bin;

calculating a differential value of the weights by considering the first neural network and the second neural network as a connected neural network and performing error backpropagation on the connected neural network; and updating the weights based on the differential value of the weights calculated by the calculating the differential value, wherein an observed speech signal from which the features of the observed signal of the speech are extracted is a same observed speech signal as the observed speech signal from which the features of the speech of the target speaker are extracted, and the calculating the mask includes receiving feature vector series of the observation signal, and outputting a mask for extracting a noise signal besides the mask for extracting the target signal to integrate the mask for extracting a noise signal obtained as output, wherein the process further includes calculating a spatial correlation matrix of the noise signal, using the integration mask.

5. A mask calculation neural network learning device comprising:

a memory; and a processor coupled to the memory and programmed to execute a process comprising:

calculating weights corresponding to respective clusters in a first neural network with at least one of layers divided into the clusters, based on a signal of speech of a target speaker using a second neural network;

extracting, separately from said calculating the weights, features of an observed speech signal including at least overlapped speech of a plurality of speakers including the target speaker;

calculating a mask for extracting features of speech of the target speaker from the features of the observed speech signal of the plurality of speakers, based on the features in the observed speech signal of the plurality of speakers using the first neural network weighted by the weights calculated by the calculating the weights, the signal of the speech of the target speaker being provided separately from the observed speech signal, the mask being a time-frequency mask for extracting the target signal from an observation signal, with respect to each time-frequency bin;

calculating a differential value of a parameter of the first neural network by considering the first neural network and the second neural network as a connected neural network and performing error backpropagation on the connected neural network;

updating the parameter of the first neural network based on the differential value of the parameter calculated by the calculating the differential value;

calculating a differential value of a parameter of the second neural network by performing error backpropagation on the connected neural network; and updating the parameter of the second neural network based on the differential value of the parameter of the second neural network calculated by the calculating the differential value of the second neural network, wherein the observed speech signal from which the features of the observed speech signal are extracted is a same observed speech signal as the observed speech signal from which the features of the speech of the target speaker are extracted, and the calculating a mask includes receiving feature vector series of the observation signal, and outputting a mask for extracting a noise signal besides the mask for extracting the target signal to integrate the mask for extracting the noise signal obtained as output, wherein the process further includes calculating a spatial correlation matrix of the noise signal, using the integration mask.

6. A mask calculation method executed by a computer, the mask calculation method comprising:

extracting features from an observed speech signal including at least overlapped speech of a plurality of speakers including a target speaker;

extracting, separately from said extracting the features from the observed speech signal, features from a speech signal for the target speaker serving as adaptation data of the target speaker, the speech signal of a target signal being provided separately from the observed speech signal, the mask being a time-frequency mask for extracting the target signal from an observation signal, with respect to each time-frequency bin;

calculating a mask for extracting speech of the target speaker from the observed signal based on the features of the observed signal and the features of the speech signal for the target speaker; and calculating the signal of the speech of the target speaker from the observed speech signal based on the mask, wherein the observed speech signal from which the features of the observed speech signal are extracted is a same observed speech signal as the observed speech signal from which the signal of the speech of the target speaker is calculated, and the calculating the mask includes receiving feature vector series of the observation signal, and outputting a mask for extracting a noise signal besides the mask for extracting the target signal to integrate the mask for extracting a noise signal obtained as output, wherein the mask calculation method further includes calculating a spatial correlation matrix of the noise signal, using the integration mask.

7. A cluster weight learning method executed by a computer, the cluster weight learning method comprising:

calculating weights corresponding to respective clusters in a first neural network with at least one of layers divided into the clusters, based on a signal of speech of a target speaker using a second neural network;

extracting, separately from said calculating the weights, features in an observed speech signal including at least overlapped speech of a plurality of speakers including the target speaker;

calculating a mask for extracting features of the speech of the target speaker from the features in the observed speech signal of the plurality of speakers based on the features in the observed speech signal of the plurality of speakers using the first neural network weighted by the weights calculated by the calculating the weights, the signal of the speech of the target speaker being provided separately from the observed speech signal, the mask being a time-frequency mask for extracting the target signal from an observation signal, with respect to each time-frequency bin;

calculating a differential value of the weights by considering the first neural network and the second neural network as a connected neural network and performing error backpropagation on the connected neural network; and updating the weights based on the differential value of the weights calculated by the calculating the differential value of the weights, wherein the observed speech signal from which the features of the observed speech signal are extracted is a same observed speech signal as the observed speech signal from which the features of the speech of the target speaker are extracted, and the calculating the mask includes receiving feature vector series of the observation signal, and outputting a mask for extracting a noise signal besides the mask for extracting the target signal to integrate the mask for extracting a noise signal obtained as output, wherein the cluster weight learning method further includes calculating a spatial correlation matrix of the noise signal, using the integration mask.

8. A mask calculation neural network learning method executed by a computer, the mask calculation neural network learning method comprising:

calculating weights corresponding to respective clusters in a first neural network with at least one of layers divided into the clusters, based on a signal of speech of a target speaker using a second neural network;

extracting, separately from said calculating the weights, features of an observed speech signal including at least overlapped speech of a plurality of speakers including the target speaker;

calculating a mask for extracting features of speech of the target speaker from the features in the observed speech signal of the plurality of speakers based on the features in the observed speech signal of the plurality of speakers using the first neural network weighted by the weights calculated by the calculating the weights, the signal of the speech of the target speaker being provided separately from the observed speech signal, the mask being a time-frequency mask for extracting the target signal from an observation signal, with respect to each time-frequency bin;

calculating a differential value of a parameter of the first neural network by considering the first neural network and the second neural network as a connected neural network and performing error backpropagation on the connected neural network;

updating the parameter of the first neural network based on the differential value of the parameter calculated by the calculating the differential value of the parameter of the first neural network;

calculating a differential value of a parameter of the second neural network by performing error backpropagation on the connected neural network; and updating the parameter of the second neural network based on the differential value of the parameter of the second neural network calculated by the calculating the differential value of the parameter of the second neural network, wherein the observed speech signal from which the features of the observed speech signal are extracted is a same observed speech signal as the observed speech signal from which the features of the speech of the target speaker are extracted, and the calculating the mask includes receiving feature vector series of the observation signal, and outputting a mask for extracting a noise signal besides the mask for extracting the target signal to integrate the mask for extracting a noise signal obtained as output, wherein the mask calculation neural network learning method further includes calculating a spatial correlation matrix of the noise signal, using the integration mask.

* * * * *